(12) United States Patent
Gallina et al.

(10) Patent No.: US 11,593,915 B2
(45) Date of Patent: Feb. 28, 2023

(54) PARALLAX-TOLERANT PANORAMIC IMAGE GENERATION

(71) Applicant: Zebra Technologies Corporation, Lincolnshire, IL (US)

(72) Inventors: Giorgio Gallina, Hamilton (CA); Sam Leitch, Waterdown (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/076,611

(22) Filed: Oct. 21, 2020

(65) Prior Publication Data
US 2022/0122220 A1   Apr. 21, 2022

(51) Int. Cl.
*G06T 3/40* (2006.01)
*G06T 7/73* (2017.01)
(Continued)

(52) U.S. Cl.
CPC .............. *G06T 3/4038* (2013.01); *G06T 7/55* (2017.01); *G06T 7/73* (2017.01); *H04N 5/23238* (2013.01);
(Continued)

(58) Field of Classification Search
CPC ........... G06T 3/4038; G06T 7/55; G06T 7/73; G06T 2207/10028; G06T 2207/30168;
(Continued)

(56) References Cited

U.S. PATENT DOCUMENTS 5,209,712 A   5/1993   Ferri
5,214,615 A   5/1993   Bauer
(Continued)

FOREIGN PATENT DOCUMENTS

CA   2835830   11/2012
CA   3028156   1/2018
(Continued)

OTHER PUBLICATIONS

Rusu et al. "Towards 3D Point cloud based object maps for household environments," Science Direct. vol. 56, Issue 11, pp. 927-947. https://www.sciencedirect.com/science/article/pii/S0921889008001140#fig4. Nov. 30, 2008. (Year: 2008).*
(Continued)

*Primary Examiner* — Farzana Hossain

(57) ABSTRACT

A method for generating a parallax-tolerant panoramic image includes obtaining a point cloud captured by a depth sensor, the point cloud representing a support structure bearing a set of objects; obtaining a set of images of the support structure and the set of objects, the set of images captured by an image sensor from a plurality of positions alongside a length of the support structure; generating a mesh structure using the point cloud, the mesh structure including a plurality of patches and representing a surface of the support structure and the set of objects; for each patch in the mesh structure, selecting an image from the set of images and projecting the selected image to the mesh patch; and generating an orthographic projection of the mesh structure onto a shelf plane of the support structure.

19 Claims, 11 Drawing Sheets

(51) Int. Cl.
*G06T 7/55* (2017.01)
*H04N 5/232* (2006.01)

(52) U.S. Cl.
CPC .............. *G06T 2207/10028* (2013.01); *G06T 2207/30168* (2013.01)

(58) Field of Classification Search
CPC ..... G06T 15/04; G06T 17/20; H04N 5/23238; H04N 5/232; H04N 5/23299
See application file for complete search history.

(56) References Cited

U.S. PATENT DOCUMENTS

| | | | |
|---|---|---|---|
| 5,408,322 | A | 4/1995 | Hsu et al. |
| 5,414,268 | A | 5/1995 | McGee |
| 5,423,617 | A | 6/1995 | Marsh et al. |
| 5,534,762 | A | 7/1996 | Kim |
| 5,566,280 | A | 10/1996 | Fukui et al. |
| 5,704,049 | A | 12/1997 | Briechle |
| 5,953,055 | A | 9/1999 | Huang et al. |
| 5,988,862 | A * | 11/1999 | Kacyra ............... G01B 11/002 702/155 |
| 6,026,376 | A | 2/2000 | Kenney |
| 6,034,379 | A | 3/2000 | Bunte et al. |
| 6,075,905 | A | 6/2000 | Herman et al. |
| 6,115,114 | A | 9/2000 | Berg et al. |
| 6,141,293 | A | 10/2000 | Amorai-Moriya et al. |
| 6,304,855 | B1 | 10/2001 | Burke |
| 6,442,507 | B1 | 8/2002 | Skidmore et al. |
| 6,549,825 | B2 | 4/2003 | Kurata |
| 6,580,441 | B2 | 6/2003 | Schileru-Key |
| 6,711,293 | B1 | 3/2004 | Lowe |
| 6,721,723 | B1 | 4/2004 | Gibson et al. |
| 6,721,769 | B1 | 4/2004 | Rappaport et al. |
| 6,836,567 | B1 | 12/2004 | Silver et al. |
| 6,995,762 | B1 | 2/2006 | Pavlidis et al. |
| 7,090,135 | B2 | 8/2006 | Patel |
| 7,137,207 | B2 | 11/2006 | Armstrong et al. |
| 7,245,558 | B2 | 7/2007 | Willins et al. |
| 7,248,754 | B2 | 7/2007 | Cato |
| 7,277,187 | B2 | 10/2007 | Smith et al. |
| 7,373,722 | B2 | 5/2008 | Cooper et al. |
| 7,474,389 | B2 | 1/2009 | Greenberg et al. |
| 7,487,595 | B2 | 2/2009 | Armstrong et al. |
| 7,493,336 | B2 | 2/2009 | Noonan |
| 7,508,794 | B2 | 3/2009 | Feather et al. |
| 7,527,205 | B2 | 5/2009 | Zhu et al. |
| 7,605,817 | B2 | 10/2009 | Zhang et al. |
| 7,647,752 | B2 | 1/2010 | Magnell |
| 7,693,757 | B2 | 4/2010 | Zimmerman |
| 7,726,575 | B2 | 6/2010 | Wang et al. |
| 7,751,928 | B1 | 7/2010 | Antony et al. |
| 7,783,383 | B2 | 8/2010 | Eliuk et al. |
| 7,839,531 | B2 | 11/2010 | Sugiyama |
| 7,845,560 | B2 | 12/2010 | Emanuel et al. |
| 7,885,865 | B2 | 2/2011 | Benson et al. |
| 7,925,114 | B2 | 4/2011 | Mai et al. |
| 7,957,998 | B2 | 6/2011 | Riley et al. |
| 7,996,179 | B2 | 8/2011 | Lee et al. |
| 8,009,864 | B2 | 8/2011 | Linaker et al. |
| 8,049,621 | B1 | 11/2011 | Egan |
| 8,091,782 | B2 | 1/2012 | Cato et al. |
| 8,094,902 | B2 | 1/2012 | Crandall et al. |
| 8,094,937 | B2 | 1/2012 | Teoh et al. |
| 8,132,728 | B2 | 3/2012 | Dwinell et al. |
| 8,134,717 | B2 | 3/2012 | Pangrazio et al. |
| 8,189,855 | B2 | 5/2012 | Opalach et al. |
| 8,199,977 | B2 | 6/2012 | Krishnaswamy et al. |
| 8,207,964 | B1 | 6/2012 | Meadow et al. |
| 8,233,055 | B2 | 7/2012 | Matsunaga et al. |
| 8,260,742 | B2 | 9/2012 | Cognigni et al. |
| 8,265,895 | B2 | 9/2012 | Willins et al. |
| 8,277,396 | B2 | 10/2012 | Scott et al. |
| 8,284,988 | B2 | 10/2012 | Sones et al. |
| 8,423,431 | B1 | 4/2013 | Rouaix et al. |
| 8,429,004 | B2 | 4/2013 | Hamilton et al. |
| 8,463,079 | B2 | 6/2013 | Ackley et al. |
| 8,479,996 | B2 | 7/2013 | Barkan et al. |
| 8,520,067 | B2 | 8/2013 | Ersue |
| 8,542,252 | B2 | 9/2013 | Perez et al. |
| 8,571,314 | B2 | 10/2013 | Tao et al. |
| 8,599,303 | B2 | 12/2013 | Stettner |
| 8,630,924 | B2 | 1/2014 | Groenevelt et al. |
| 8,660,338 | B2 | 2/2014 | Ma et al. |
| 8,743,176 | B2 | 6/2014 | Stettner et al. |
| 8,757,479 | B2 | 6/2014 | Clark et al. |
| 8,812,226 | B2 | 8/2014 | Zeng |
| 8,923,893 | B2 | 12/2014 | Austin et al. |
| 8,939,369 | B2 | 1/2015 | Olmstead et al. |
| 8,954,188 | B2 | 2/2015 | Sullivan et al. |
| 8,958,911 | B2 | 2/2015 | Wong et al. |
| 8,971,637 | B1 | 3/2015 | Rivard |
| 8,989,342 | B2 | 3/2015 | Liesenfelt et al. |
| 9,007,601 | B2 | 4/2015 | Steffey et al. |
| 9,037,287 | B1 | 5/2015 | Grauberger et al. |
| 9,064,394 | B1 | 6/2015 | Trundle |
| 9,070,285 | B1 | 6/2015 | Ramu et al. |
| 9,072,929 | B1 | 7/2015 | Rush et al. |
| 9,120,622 | B1 | 9/2015 | Elazary et al. |
| 9,129,277 | B2 | 9/2015 | Macintosh |
| 9,135,491 | B2 | 9/2015 | Morandi et al. |
| 9,159,047 | B2 | 10/2015 | Winkel |
| 9,171,442 | B2 | 10/2015 | Clements |
| 9,247,211 | B2 | 1/2016 | Zhang et al. |
| 9,329,269 | B2 | 5/2016 | Zeng |
| 9,349,076 | B1 | 5/2016 | Liu et al. |
| 9,367,831 | B1 | 6/2016 | Besehanic |
| 9,380,222 | B2 | 6/2016 | Clayton et al. |
| 9,396,554 | B2 | 7/2016 | Williams et al. |
| 9,400,170 | B2 | 7/2016 | Steffey |
| 9,424,482 | B2 | 8/2016 | Patel et al. |
| 9,517,767 | B1 | 12/2016 | Kentley et al. |
| 9,542,746 | B2 | 1/2017 | Wu et al. |
| 9,547,838 | B2 | 1/2017 | Larsen |
| 9,549,125 | B1 | 1/2017 | Goyal et al. |
| 9,562,971 | B2 | 2/2017 | Shenkar |
| 9,565,400 | B1 | 2/2017 | Curlander et al. |
| 9,589,353 | B2 | 3/2017 | Mueller-Fischer et al. |
| 9,600,731 | B2 | 3/2017 | Yasunaga et al. |
| 9,600,892 | B2 | 3/2017 | Patel et al. |
| 9,612,123 | B1 | 4/2017 | Levinson et al. |
| 9,639,935 | B1 | 5/2017 | Douady-Pleven et al. |
| 9,697,429 | B2 | 7/2017 | Patel et al. |
| 9,766,074 | B2 | 9/2017 | Roumeliotis et al. |
| 9,778,388 | B1 | 10/2017 | Connor |
| 9,779,205 | B2 | 10/2017 | Namir |
| 9,791,862 | B1 | 10/2017 | Connor |
| 9,805,240 | B1 | 10/2017 | Zheng et al. |
| 9,811,754 | B2 | 11/2017 | Schwartz |
| 9,827,683 | B1 | 11/2017 | Hance et al. |
| 9,880,009 | B2 | 1/2018 | Bell |
| 9,928,708 | B2 | 3/2018 | Lin et al. |
| 9,953,420 | B2 | 4/2018 | Wolski et al. |
| 9,980,009 | B2 | 5/2018 | Jiang et al. |
| 9,994,339 | B2 | 6/2018 | Colson et al. |
| 9,996,818 | B1 | 6/2018 | Ren et al. |
| 10,019,803 | B2 | 7/2018 | Venable et al. |
| 10,111,646 | B2 | 10/2018 | Nycz et al. |
| 10,121,072 | B1 | 11/2018 | Kekatpure |
| 10,127,438 | B1 | 11/2018 | Fisher et al. |
| 10,133,951 | B1 | 11/2018 | Mendonca et al. |
| 10,197,400 | B2 | 2/2019 | Jesudason et al. |
| 10,210,603 | B2 | 2/2019 | Venable et al. |
| 10,229,386 | B2 | 3/2019 | Thomas |
| 10,248,653 | B2 | 4/2019 | Blassin et al. |
| 10,262,294 | B1 | 4/2019 | Hahn et al. |
| 10,265,871 | B2 | 4/2019 | Hance et al. |
| 10,289,990 | B2 | 5/2019 | Rizzolo et al. |
| 10,336,543 | B1 | 7/2019 | Sills et al. |
| 10,349,031 | B2 | 7/2019 | DeLuca |
| 10,352,689 | B2 | 7/2019 | Brown et al. |
| 10,373,116 | B2 | 8/2019 | Medina et al. |
| 10,394,244 | B2 | 8/2019 | Song et al. |
| 2001/0031069 | A1 | 10/2001 | Kondo et al. |

(56) References Cited

U.S. PATENT DOCUMENTS

| | | |
|---|---|---|
| 2001/0041948 A1 | 11/2001 | Ross et al. |
| 2002/0006231 A1 | 1/2002 | Jayant et al. |
| 2002/0059202 A1 | 5/2002 | Hadzikadic et al. |
| 2002/0097439 A1 | 7/2002 | Braica |
| 2002/0146170 A1 | 10/2002 | Rom |
| 2002/0158453 A1 | 10/2002 | Levine |
| 2002/0164236 A1 | 11/2002 | Fukuhara et al. |
| 2003/0003925 A1 | 1/2003 | Suzuki |
| 2003/0094494 A1 | 5/2003 | Blanford et al. |
| 2003/0174891 A1 | 9/2003 | Wenzel et al. |
| 2004/0021313 A1 | 2/2004 | Gardner et al. |
| 2004/0084527 A1 | 5/2004 | Bong et al. |
| 2004/0131278 A1 | 7/2004 | Imagawa et al. |
| 2004/0240754 A1 | 12/2004 | Smith et al. |
| 2005/0016004 A1 | 1/2005 | Armstrong et al. |
| 2005/0114059 A1 | 5/2005 | Chang et al. |
| 2005/0128195 A1 | 6/2005 | Houston et al. |
| 2005/0174351 A1 | 8/2005 | Chang |
| 2005/0213082 A1 | 9/2005 | DiBernardo et al. |
| 2005/0213109 A1 | 9/2005 | Schell et al. |
| 2005/0237320 A1* | 10/2005 | Itoh .................. G06T 11/60 345/418 |
| 2006/0032915 A1 | 2/2006 | Schwartz |
| 2006/0045325 A1 | 3/2006 | Zavadsky et al. |
| 2006/0064286 A1 | 3/2006 | Fink et al. |
| 2006/0106742 A1 | 5/2006 | Bochicchio et al. |
| 2006/0279527 A1 | 12/2006 | Zehner et al. |
| 2006/0285486 A1 | 12/2006 | Roberts et al. |
| 2007/0036398 A1 | 2/2007 | Chen |
| 2007/0074410 A1 | 4/2007 | Armstrong et al. |
| 2007/0272732 A1 | 11/2007 | Hindmon |
| 2008/0002866 A1 | 1/2008 | Fujiwara |
| 2008/0025565 A1 | 1/2008 | Zhang et al. |
| 2008/0027591 A1 | 1/2008 | Lenser et al. |
| 2008/0077511 A1 | 3/2008 | Zimmerman |
| 2008/0159634 A1 | 7/2008 | Sharma et al. |
| 2008/0164310 A1 | 7/2008 | Dupuy et al. |
| 2008/0175513 A1 | 7/2008 | Lai et al. |
| 2008/0181529 A1 | 7/2008 | Michel et al. |
| 2008/0183730 A1 | 7/2008 | Enga |
| 2008/0238919 A1 | 10/2008 | Pack |
| 2008/0294487 A1 | 11/2008 | Nasser |
| 2009/0009123 A1 | 1/2009 | Skaff |
| 2009/0024353 A1 | 1/2009 | Lee et al. |
| 2009/0057411 A1 | 3/2009 | Madej et al. |
| 2009/0059270 A1 | 3/2009 | Opalach et al. |
| 2009/0060349 A1 | 3/2009 | Linaker et al. |
| 2009/0063306 A1 | 3/2009 | Fano et al. |
| 2009/0063307 A1 | 3/2009 | Groenovelt et al. |
| 2009/0074303 A1 | 3/2009 | Filimonova et al. |
| 2009/0088975 A1 | 4/2009 | Sato et al. |
| 2009/0103773 A1 | 4/2009 | Wheeler et al. |
| 2009/0125350 A1 | 5/2009 | Lessing et al. |
| 2009/0125535 A1 | 5/2009 | Basso et al. |
| 2009/0152391 A1 | 6/2009 | McWhirk |
| 2009/0160975 A1 | 6/2009 | Kwan |
| 2009/0192921 A1 | 7/2009 | Hicks |
| 2009/0206161 A1 | 8/2009 | Olmstead |
| 2009/0236155 A1 | 9/2009 | Skaff |
| 2009/0252437 A1 | 10/2009 | Li et al. |
| 2009/0287587 A1 | 11/2009 | Bloebaum et al. |
| 2009/0323121 A1 | 12/2009 | Valkenburg et al. |
| 2010/0017407 A1 | 1/2010 | Beniyama et al. |
| 2010/0026804 A1 | 2/2010 | Tanizaki et al. |
| 2010/0070365 A1 | 3/2010 | Siotia et al. |
| 2010/0082194 A1 | 4/2010 | Yabushita et al. |
| 2010/0091094 A1 | 4/2010 | Sekowski |
| 2010/0118116 A1 | 5/2010 | Tomasz et al. |
| 2010/0131234 A1 | 5/2010 | Stewart et al. |
| 2010/0141806 A1 | 6/2010 | Uemura et al. |
| 2010/0161569 A1 | 6/2010 | Schreter |
| 2010/0171826 A1 | 7/2010 | Hamilton et al. |
| 2010/0208039 A1 | 8/2010 | Setettner |
| 2010/0214873 A1 | 8/2010 | Somasundaram et al. |
| 2010/0235033 A1 | 9/2010 | Yamamoto et al. |
| 2010/0241289 A1 | 9/2010 | Sandberg |
| 2010/0257149 A1 | 10/2010 | Cognigni et al. |
| 2010/0295850 A1 | 11/2010 | Katz et al. |
| 2010/0315412 A1 | 12/2010 | Sinha et al. |
| 2010/0326939 A1 | 12/2010 | Clark et al. |
| 2011/0047636 A1 | 2/2011 | Stachon et al. |
| 2011/0052043 A1 | 3/2011 | Hyung et al. |
| 2011/0093306 A1 | 4/2011 | Nielsen et al. |
| 2011/0137527 A1 | 6/2011 | Simon et al. |
| 2011/0168774 A1 | 7/2011 | Magal |
| 2011/0172875 A1 | 7/2011 | Gibbs |
| 2011/0188759 A1 | 8/2011 | Filimonova et al. |
| 2011/0216063 A1 | 9/2011 | Hayes |
| 2011/0242286 A1 | 10/2011 | Pace et al. |
| 2011/0246503 A1 | 10/2011 | Bender et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0017028 A1 | 1/2012 | Tsirkin |
| 2012/0019393 A1 | 1/2012 | Wolinsky et al. |
| 2012/0022913 A1 | 1/2012 | Volkmann et al. |
| 2012/0051730 A1 | 3/2012 | Cote et al. |
| 2012/0069051 A1 | 3/2012 | Hagbi et al. |
| 2012/0075342 A1 | 3/2012 | Choubassi et al. |
| 2012/0133639 A1 | 5/2012 | Kopf et al. |
| 2012/0307108 A1 | 6/2012 | Forutanpour |
| 2012/0169530 A1 | 7/2012 | Padmanabhan et al. |
| 2012/0179621 A1 | 7/2012 | Moir et al. |
| 2012/0185112 A1 | 7/2012 | Sung et al. |
| 2012/0194644 A1 | 8/2012 | Newcombe et al. |
| 2012/0197464 A1 | 8/2012 | Wang et al. |
| 2012/0201466 A1 | 8/2012 | Funayama et al. |
| 2012/0209553 A1 | 8/2012 | Doytchinov et al. |
| 2012/0236119 A1 | 9/2012 | Rhee et al. |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0278782 A1 | 11/2012 | Pal et al. |
| 2012/0287249 A1 | 11/2012 | Choo et al. |
| 2012/0323620 A1 | 12/2012 | Hofman et al. |
| 2013/0030700 A1 | 1/2013 | Miller et al. |
| 2013/0076586 A1 | 3/2013 | Karhuketo et al. |
| 2013/0090881 A1 | 4/2013 | Janardhanan et al. |
| 2013/0119138 A1 | 5/2013 | Winkel |
| 2013/0132913 A1 | 5/2013 | Fu et al. |
| 2013/0134178 A1 | 5/2013 | Lu |
| 2013/0138246 A1 | 5/2013 | Gutmann et al. |
| 2013/0138534 A1 | 5/2013 | Herwig |
| 2013/0142421 A1 | 6/2013 | Silver et al. |
| 2013/0144565 A1 | 6/2013 | Miller |
| 2013/0154802 A1 | 6/2013 | O'Haire et al. |
| 2013/0156292 A1 | 6/2013 | Chang et al. |
| 2013/0162806 A1 | 6/2013 | Ding et al. |
| 2013/0169681 A1 | 7/2013 | Rasane et al. |
| 2013/0176398 A1 | 7/2013 | Bonner et al. |
| 2013/0178227 A1 | 7/2013 | Vartanian et al. |
| 2013/0182114 A1 | 7/2013 | Zhang et al. |
| 2013/0226344 A1 | 8/2013 | Wong et al. |
| 2013/0228620 A1 | 9/2013 | Ahern et al. |
| 2013/0232039 A1 | 9/2013 | Jackson et al. |
| 2013/0235165 A1 | 9/2013 | Gharib et al. |
| 2013/0235206 A1 | 9/2013 | Smith et al. |
| 2013/0236089 A1 | 9/2013 | Litvak et al. |
| 2013/0278631 A1 | 10/2013 | Border et al. |
| 2013/0299306 A1 | 11/2013 | Jiang et al. |
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2013/0342363 A1 | 12/2013 | Paek et al. |
| 2014/0002597 A1 | 1/2014 | Taguchi et al. |
| 2014/0003655 A1 | 1/2014 | Gopalkrishnan et al. |
| 2014/0003727 A1 | 1/2014 | Lortz et al. |
| 2014/0006229 A1 | 1/2014 | Birch et al. |
| 2014/0016832 A1 | 1/2014 | Kong et al. |
| 2014/0019311 A1 | 1/2014 | Tanaka |

(56) References Cited

U.S. PATENT DOCUMENTS

| | | |
|---|---|---|
| 2014/0025201 A1 | 1/2014 | Ryu et al. |
| 2014/0028837 A1 | 1/2014 | Gao et al. |
| 2014/0047342 A1 | 2/2014 | Breternitz et al. |
| 2014/0049616 A1 | 2/2014 | Stettner |
| 2014/0052555 A1 | 2/2014 | MacIntosh |
| 2014/0086483 A1 | 3/2014 | Zhang et al. |
| 2014/0098094 A1 | 4/2014 | Neumann et al. |
| 2014/0100813 A1 | 4/2014 | Shaowering |
| 2014/0104413 A1 | 4/2014 | McCloskey et al. |
| 2014/0112537 A1 | 4/2014 | Frank et al. |
| 2014/0129027 A1 | 5/2014 | Schnittman |
| 2014/0133740 A1 | 5/2014 | Plagemann et al. |
| 2014/0156133 A1 | 6/2014 | Cullinane et al. |
| 2014/0161359 A1 | 6/2014 | Magri et al. |
| 2014/0192050 A1 | 7/2014 | Qiu et al. |
| 2014/0195095 A1 | 7/2014 | Flohr et al. |
| 2014/0195374 A1 | 7/2014 | Bassemir et al. |
| 2014/0214547 A1 | 7/2014 | Signorelli et al. |
| 2014/0214600 A1 | 7/2014 | Argue et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0277692 A1 | 9/2014 | Buzan et al. |
| 2014/0279294 A1 | 9/2014 | Field-Darragh et al. |
| 2014/0300637 A1 | 10/2014 | Fan et al. |
| 2014/0316875 A1 | 10/2014 | Tkachenko et al. |
| 2014/0330835 A1 | 11/2014 | Boyer |
| 2014/0344401 A1 | 11/2014 | Varney et al. |
| 2014/0351073 A1 | 11/2014 | Murphy et al. |
| 2014/0369607 A1 | 12/2014 | Patel et al. |
| 2015/0015602 A1 | 1/2015 | Beaudoin |
| 2015/0019391 A1 | 1/2015 | Kumar et al. |
| 2015/0029339 A1 | 1/2015 | Kobres et al. |
| 2015/0032304 A1 | 1/2015 | Nakamura et al. |
| 2015/0039458 A1 | 2/2015 | Reid |
| 2015/0052029 A1 | 2/2015 | Wu et al. |
| 2015/0088618 A1 | 3/2015 | Basir et al. |
| 2015/0088701 A1 | 3/2015 | Desmarais et al. |
| 2015/0088703 A1 | 3/2015 | Yan |
| 2015/0092066 A1 | 4/2015 | Geiss et al. |
| 2015/0106403 A1 | 4/2015 | Haverinen et al. |
| 2015/0117788 A1 | 4/2015 | Patel et al. |
| 2015/0139010 A1 | 5/2015 | Jeong et al. |
| 2015/0154467 A1 | 6/2015 | Feng et al. |
| 2015/0161793 A1 | 6/2015 | Takahashi |
| 2015/0170256 A1 | 6/2015 | Pettyjohn et al. |
| 2015/0181198 A1 | 6/2015 | Baele et al. |
| 2015/0195491 A1* | 7/2015 | Shaburov ................. H04N 7/15 |
| | | 348/14.12 |
| 2015/0212521 A1 | 7/2015 | Pack et al. |
| 2015/0235157 A1 | 8/2015 | Avegliano et al. |
| 2015/0243073 A1* | 8/2015 | Chen ....................... G06T 17/20 |
| | | 345/419 |
| 2015/0245358 A1 | 8/2015 | Schmidt |
| 2015/0262116 A1 | 9/2015 | Katircioglu et al. |
| 2015/0279035 A1 | 10/2015 | Wolski et al. |
| 2015/0298317 A1 | 10/2015 | Wang et al. |
| 2015/0310601 A1 | 10/2015 | Rodriguez et al. |
| 2015/0332368 A1 | 11/2015 | Vartiainen et al. |
| 2015/0352721 A1 | 12/2015 | Wicks et al. |
| 2015/0353280 A1 | 12/2015 | Brazeau et al. |
| 2015/0355639 A1 | 12/2015 | Versteeg et al. |
| 2015/0363625 A1 | 12/2015 | Wu et al. |
| 2015/0363758 A1 | 12/2015 | Wu et al. |
| 2015/0365660 A1 | 12/2015 | Wu et al. |
| 2015/0379704 A1 | 12/2015 | Chandrasekar et al. |
| 2016/0026253 A1 | 1/2016 | Bradski et al. |
| 2016/0042223 A1 | 2/2016 | Suh et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0012588 A1 | 4/2016 | Taguchi et al. |
| 2016/0104041 A1 | 4/2016 | Bowers et al. |
| 2016/0107690 A1 | 4/2016 | Oyama et al. |
| 2016/0112628 A1 | 4/2016 | Super et al. |
| 2016/0114488 A1 | 4/2016 | Mascorro Medina et al. |
| 2016/0129592 A1 | 5/2016 | Saboo et al. |
| 2016/0132815 A1 | 5/2016 | Itoko et al. |
| 2016/0150217 A1 | 5/2016 | Popov |
| 2016/0156898 A1 | 6/2016 | Ren et al. |
| 2016/0163067 A1 | 6/2016 | Williams et al. |
| 2016/0171336 A1 | 6/2016 | Schwartz |
| 2016/0171429 A1 | 6/2016 | Schwartz |
| 2016/0171707 A1 | 6/2016 | Schwartz |
| 2016/0185347 A1 | 6/2016 | Lefevre et al. |
| 2016/0191759 A1 | 6/2016 | Somanath et al. |
| 2016/0224927 A1 | 8/2016 | Pettersson |
| 2016/0253735 A1 | 9/2016 | Scudillo et al. |
| 2016/0253844 A1 | 9/2016 | Petrovskaya et al. |
| 2016/0259329 A1 | 9/2016 | High et al. |
| 2016/0260051 A1 | 9/2016 | Wu et al. |
| 2016/0260054 A1 | 9/2016 | High et al. |
| 2016/0271795 A1 | 9/2016 | Vicenti |
| 2016/0290805 A1 | 10/2016 | Irish et al. |
| 2016/0313133 A1 | 10/2016 | Zeng et al. |
| 2016/0328618 A1 | 11/2016 | Patel et al. |
| 2016/0328767 A1 | 11/2016 | Bonner et al. |
| 2016/0353099 A1 | 12/2016 | Thomson et al. |
| 2016/0364634 A1 | 12/2016 | Davis et al. |
| 2017/0004649 A1 | 1/2017 | Collet Romea et al. |
| 2017/0011281 A1 | 1/2017 | Dijkman et al. |
| 2017/0011308 A1 | 1/2017 | Sun et al. |
| 2017/0030538 A1 | 2/2017 | Geisler et al. |
| 2017/0032311 A1 | 2/2017 | Rizzolo et al. |
| 2017/0041553 A1 | 2/2017 | Cao et al. |
| 2017/0054965 A1 | 2/2017 | Raab et al. |
| 2017/0066459 A1 | 3/2017 | Singh |
| 2017/0074659 A1 | 3/2017 | Giurgiu et al. |
| 2017/0083774 A1 | 3/2017 | Solar et al. |
| 2017/0084037 A1* | 3/2017 | Barajas Hernandez ..................... |
| | | G01C 21/26 |
| 2017/0109940 A1 | 4/2017 | Guo et al. |
| 2017/0147966 A1 | 5/2017 | Aversa et al. |
| 2017/0150129 A1 | 5/2017 | Pangrazio |
| 2017/0178060 A1 | 6/2017 | Schwartz |
| 2017/0178227 A1 | 6/2017 | Gornish |
| 2017/0178301 A1* | 6/2017 | Moraleda .................. G06T 7/62 |
| 2017/0178310 A1 | 6/2017 | Gornish |
| 2017/0193434 A1 | 7/2017 | Shah et al. |
| 2017/0205892 A1* | 7/2017 | Petrovskaya ........... G06T 17/20 |
| 2017/0219338 A1 | 8/2017 | Brown et al. |
| 2017/0219353 A1 | 8/2017 | Alesiani |
| 2017/0227645 A1 | 8/2017 | Swope et al. |
| 2017/0227647 A1 | 8/2017 | Baik |
| 2017/0228885 A1 | 8/2017 | Baumgartner |
| 2017/0261993 A1 | 9/2017 | Venable et al. |
| 2017/0262724 A1 | 9/2017 | Wu et al. |
| 2017/0280125 A1 | 9/2017 | Brown et al. |
| 2017/0286773 A1 | 10/2017 | Skaff et al. |
| 2017/0286901 A1* | 10/2017 | Skaff .................... G06V 10/245 |
| 2017/0297478 A1 | 10/2017 | Sherman et al. |
| 2017/0323253 A1 | 11/2017 | Enssle et al. |
| 2017/0323376 A1 | 11/2017 | Glaser et al. |
| 2017/0337508 A1 | 11/2017 | Bogolea et al. |
| 2018/0001481 A1 | 1/2018 | Shah et al. |
| 2018/0005035 A1 | 1/2018 | Bogolea et al. |
| 2018/0005176 A1 | 1/2018 | Williams et al. |
| 2018/0020145 A1 | 1/2018 | Kotfis et al. |
| 2018/0051991 A1 | 2/2018 | Hong |
| 2018/0053091 A1 | 2/2018 | Savvides et al. |
| 2018/0053305 A1 | 2/2018 | Gu et al. |
| 2018/0075403 A1 | 3/2018 | Mascorro Medina et al. |
| 2018/0089613 A1 | 3/2018 | Chen et al. |
| 2018/0101813 A1 | 4/2018 | Paat et al. |
| 2018/0108120 A1 | 4/2018 | Venable et al. |
| 2018/0108134 A1 | 4/2018 | Venable et al. |
| 2018/0114183 A1 | 4/2018 | Howell |
| 2018/0129201 A1 | 5/2018 | Douglas et al. |
| 2018/0130011 A1 | 5/2018 | Jacobsson |
| 2018/0143003 A1 | 5/2018 | Clayton et al. |
| 2018/0174325 A1 | 6/2018 | Fu et al. |
| 2018/0190160 A1 | 7/2018 | Bryan et al. |
| 2018/0197139 A1 | 7/2018 | Hill |

(56) References Cited

U.S. PATENT DOCUMENTS

| | | |
|---|---|---|
| 2018/0201423 A1 | 7/2018 | Drzewiecki et al. |
| 2018/0204111 A1 | 7/2018 | Zadeh et al. |
| 2018/0218218 A1 | 8/2018 | Madan et al. |
| 2018/0251253 A1 | 9/2018 | Taira et al. |
| 2018/0276596 A1 | 9/2018 | Murthy et al. |
| 2018/0281191 A1 | 10/2018 | Sinyayskiy et al. |
| 2018/0293442 A1 | 10/2018 | Fridental et al. |
| 2018/0293543 A1 | 10/2018 | Tiwari |
| 2018/0306958 A1 | 10/2018 | Goss et al. |
| 2018/0313956 A1 | 11/2018 | Rzeszutek et al. |
| 2018/0314260 A1 | 11/2018 | Jen et al. |
| 2018/0314908 A1 | 11/2018 | Lam |
| 2018/0315007 A1 | 11/2018 | Kingsford et al. |
| 2018/0315065 A1 | 11/2018 | Zhang et al. |
| 2018/0315173 A1 | 11/2018 | Phan et al. |
| 2018/0315865 A1 | 11/2018 | Haist et al. |
| 2018/0321692 A1 | 11/2018 | Castillo-Effen et al. |
| 2018/0370727 A1 | 12/2018 | Hance et al. |
| 2019/0025838 A1 | 1/2019 | Artes et al. |
| 2019/0034864 A1* | 1/2019 | Skaff .................... G06K 7/1413 |
| 2019/0049962 A1 | 2/2019 | Ouellette et al. |
| 2019/0057588 A1 | 2/2019 | Savvides et al. |
| 2019/0065861 A1 | 2/2019 | Savvides et al. |
| 2019/0073554 A1 | 3/2019 | Rzeszutek |
| 2019/0073559 A1 | 3/2019 | Rzeszutek et al. |
| 2019/0073627 A1 | 3/2019 | Nakdimon et al. |
| 2019/0077015 A1 | 3/2019 | Shibasaki et al. |
| 2019/0087663 A1 | 3/2019 | Yamazaki et al. |
| 2019/0094876 A1 | 3/2019 | Moore et al. |
| 2019/0108606 A1 | 4/2019 | Komiyama |
| 2019/0108678 A1 | 4/2019 | Hazeghi et al. |
| 2019/0160675 A1 | 5/2019 | Paschall II et al. |
| 2019/0178436 A1 | 6/2019 | Mao et al. |
| 2019/0180150 A1* | 6/2019 | Taylor .................. G06K 7/1413 |
| 2019/0197439 A1 | 6/2019 | Wang |
| 2019/0197728 A1 | 6/2019 | Yamao |
| 2019/0236530 A1 | 8/2019 | Cantrell et al. |
| 2019/0271984 A1 | 9/2019 | Kingsford |
| 2019/0304132 A1 | 10/2019 | Yoda et al. |
| 2019/0392212 A1 | 12/2019 | Sawhney et al. |
| 2020/0049511 A1 | 2/2020 | Sithiravel et al. |
| 2020/0053325 A1 | 2/2020 | Deyle et al. |
| 2020/0068126 A1* | 2/2020 | Fink ......................... G06T 7/70 |
| 2020/0111267 A1 | 4/2020 | Stauber et al. |
| 2020/0118064 A1 | 4/2020 | Perrella et al. |
| 2020/0192388 A1 | 6/2020 | Zhang et al. |
| 2020/0314333 A1 | 10/2020 | Liang et al. |
| 2020/0341151 A1 | 10/2020 | Yoshida |
| 2020/0410766 A1* | 12/2020 | Swaminathan ....... G06T 19/006 |
| 2021/0019939 A1* | 1/2021 | Hu ......................... G06T 19/20 |
| 2021/0233305 A1* | 7/2021 | Garcia ..................... G06T 7/11 |

FOREIGN PATENT DOCUMENTS

| | | |
|---|---|---|
| CN | 102214343 | 10/2011 |
| CN | 104200086 | 12/2014 |
| CN | 105989512 | 10/2016 |
| CN | 107067382 | 8/2017 |
| CN | 206952978 | 2/2018 |
| EP | 766098 | 4/1997 |
| EP | 1311993 | 5/2007 |
| EP | 2309378 | 4/2011 |
| EP | 2439487 | 4/2012 |
| EP | 2472475 | 7/2012 |
| EP | 2562688 | 2/2013 |
| EP | 2662831 | 11/2013 |
| EP | 2693362 | 2/2014 |
| EP | 3400113 | 11/2018 |
| FR | 3001567 | 8/2014 |
| GB | 2323238 | 9/1998 |
| GB | 2330265 | 4/1999 |
| JP | 2014170431 | 9/2014 |
| JP | 2016194834 | 11/2016 |
| JP | 2017016539 | 1/2017 |
| KR | 101234798 | 1/2009 |
| KR | 1020190031431 | 3/2019 |
| WO | WO 99/23600 | 5/1999 |
| WO | WO 2003002935 | 1/2003 |
| WO | WO 2003025805 | 3/2003 |
| WO | WO 2006136958 | 12/2006 |
| WO | WO 2007042251 | 4/2007 |
| WO | WO 2008057504 | 5/2008 |
| WO | WO 2008154611 | 12/2008 |
| WO | WO 2012103199 | 8/2012 |
| WO | WO 2012103202 | 8/2012 |
| WO | WO 2012154801 | 11/2012 |
| WO | WO 2013165674 | 11/2013 |
| WO | WO 2014066422 | 5/2014 |
| WO | WO 2014092552 | 6/2014 |
| WO | WO 2014181323 | 11/2014 |
| WO | 2015/127246 A1 | 8/2015 |
| WO | WO 2015127503 | 9/2015 |
| WO | WO 2016020038 | 2/2016 |
| WO | WO 2017175312 | 10/2017 |
| WO | WO 2017187106 | 11/2017 |
| WO | WO 2018018007 | 1/2018 |
| WO | WO 2018204308 | 11/2018 |
| WO | WO 2018204342 | 11/2018 |
| WO | WO 2019023249 | 1/2019 |

OTHER PUBLICATIONS

Carreira et al., "Enhanced PCA-based localization using depth maps with missing data," IEEE, pp. 1-8, Apr. 24, 2013.

Castorena et al., "Autocalibration of lidar and optical cameras via edge alignment", 2016 IEEE International Conference on Acoustics, Speech and Signal Processing (Mar. 20, 2016).

Chen et al. "Improving Octree-Based Occupancy Maps Using Environment Sparsity with Application to Aerial Robot Navigation" Robotics and Automation (ICRA), 2017 IEEE International Conference on IEEE, pp. 3656-3663, 2017.

Clark, "Casino to open world's first NFC-enabled supermarket", (Sep. 19, 2018), pp. 1-7.

Clark, "Jogtek launches passive NFC shelf-edge labels", (Sep. 19, 2018), pp. 1-6.

Cleveland Jonas et al: "Automated System for Semantic Object Labeling with Soft-Object Recognition and Dynamic Programming Segmentation", IEEE Transactions on Automation Science and Engineering, IEEE Service Center, New York, NY (Apr. 1, 2017).

Cook et al., "Distributed Ray Tracing" ACM SIGGRAPH Computer Graphics, vol. 18, No. 3, ACM pp. 137-145, 1984.

Datta, A., et al. "Accurate camera calibration using iterative refinement of control points," in Computer Vision Workshops (ICCV Workshops), 2009.

Deschaud, et al., "A Fast and Accurate Place Detection algoritm for large noisy point clouds using filtered normals and voxel growing," 3DPVT, May 2010, Paris, France. [hal-01097361].

Douillard, Bertrand, et al. "On the segmentation of 3D LIDAR point clouds." Robotics and Automation (ICRA), 2011 IEEE International Conference on IEEE, 2011.

Dubois, M., et al., A comparison of geometric and energy-based point cloud semantic segmentation methods, European Conference on Mobile Robots (ECMR), pg. 88-93, 2527, Sep. 2013.

Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).

F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.

Federico Tombari et al. "Multimodal cue integration through Hypotheses Verification for RGB-D object recognition and 6DOF pose estimation", IEEE International Conference on Robotics and Automation, Jan. 2013.

Flores, et al., "Removing Pedestrians from Google Street View Images", Computer Vision and Pattern Recognition Workshops, 2010 IEEE Computer Society Conference on, IEE, Piscataway, NJ, pp. 53-58 (Jun. 13, 2010).

(56) References Cited

OTHER PUBLICATIONS

Glassner, "Space Subdivision for Fast Ray Tracing." IEEE Computer Graphics and Applications, 4.10, pp. 15-24, 1984.
Golovinskiy, Aleksey, et al. "Min-Cut based segmentation of point clouds." Computer Vision Workshops (ICCV Workshops), 2009 IEEE 12th International Conference on. IEEE, 2009.
Hackel et al., "Contour Detection in unstructured 3D point clouds,"IEEE, 2016 Conference on Computer vision and Pattern recognition (CVPR), Jun. 27-30, 2016, pp. 19.
Hu et al., "An improved method of discrete point cloud filtering based on complex environment," International Journal of Applied Mathematics and Statistics, v48, i18 (2013).
International Search Report and Written Opinion for International Patent Application No. PCT/US2013/070996 dated Apr. 2, 2014.
International Search Report and Written Opinion for International Patent Application No. PCT/US2013/053212 dated Dec. 1, 2014.
International Search Report and Written Opinion for corresponding International Patent Application No. PCT/US2016/064110 dated Mar. 20, 2017.
International Search Report and Written Opinion for corresponding International Patent Application No. PCT/US2017/024847 dated Jul. 7, 2017.
International Search Report and Written Opinion for International Application No. PCT/CN2017/083143 dated Feb. 11, 2018.
International Search Report and Written Opinion for International Application No. PCT/US2018/030419 dated Aug. 31, 2018.
International Search Report and Written Opinion from International Patent Application No. PCT/US2018/030345 dated Sep. 17, 2018.
International Search Report and Written Opinion from International Patent Application No. PCT/US2018/030360 dated Jul. 9, 2018.
International Search Report and Written Opinion from International Patent Application No. PCT/US2018/030363 dated Jul. 9, 2018.
International Search Report and Written Opinion for International Application No. PCT/US2019/025859 dated Jul. 3, 2019.
International Search Report and Written Opinion from International Patent Application No. PCT/US2019/025849 dated Jul. 9, 2019.
International Search Report and Written Opinion from International Patent Application No. PCT/US2019/049761 dated Nov. 15, 2019.
International Search Report and Written Opinion from International Patent Application No. PCT/US2019/051312 dated Nov. 15, 2019.
International Search Report and Written Opinion from International Patent Application No. PCT/US2019/054103 dated Jan. 6, 2020.
International Search Report and Written Opinion for International Patent Application No. PCT/US2019/057007 dated Jan. 14, 2020.
International Search Report and Written Opinion from International Patent Application No. PCT/US2019/064020 dated Feb. 19, 2020.
International Search Report and Written Opinion for International Patent Application No. PCT/US2020/027948 dated Jul. 16, 2020.
International Search Report and Written Opinion for International Patent Application No. PCT/US2020/028133 dated Jul. 24, 2020.
International Search Report and Written Opinion from International Patent Application No. PCT/US2020/029134 dated Jul. 27, 2020.
International Search Report and Written Opinion from International Patent Application No. PCT/US2020/028183 dated Jul. 24, 2020.
International Search Report and Written Opinion from International Patent Application No. PCT/US2020/035285 dated Aug. 27, 2020.
International Search Report and Written Opinion for International Patent Application No. PCT/US2021/024805 dated Aug. 2, 2021.
International Search Report and Written Opinion for International Patent Application No. PCT/US2021/057388 dated Feb. 2, 2022.
Jadhav et al. "Survey on Spatial Domain dynamic template matching technique for scanning linear barcode," International Journal of science and research v 5 n 3, Mar. 2016)(Year: 2016).
Jian Fan et al: "Shelf detection via vanishing point and radial projection", 2014 IEEE International Conference on image processing (ICIP), IEEE, (Oct. 27, 2014), pp. 1575-1578.
Kaikai Liu et al., "Enabling Context-Aware Indoor Augmented Reality via Smartphone Sensing and Vision Tracking", ACM Transactions on Multimedia Computing Communications and Applications, Association for Computer Machinery, US, vol. 12, No.

Kang et al., "Kinematic Path-Tracking of Mobile Robot Using Iterative learning Control", Journal of Robotic Systems, 2005, pp. 111-121.
Kay et al. "Ray Tracing Complex Scenes." ACM SIGGRAPH Computer Graphics, vol. 20, No. 4, ACM, pp. 269-278, 1986.
Kelly et al., "Reactive Nonholonomic Trajectory Generation via Parametric Optimal Control", International Journal of Robotics Research, vol. 22, No. 7-8, pp. 583-601 (Jul. 30, 2013).
Lari, Z., et al., "An adaptive approach for segmentation of 3D laser point cloud." International Archives of the Photogrammertry, Remote sensing and spatial information Sciences, vol. XXXVIII-5/W12, 2011, ISPRS Calgary 2011 Workshop, Aug. 29-31, 2011, Calgary, Canada.
Lecking et al: "Localization in a wide range of industrial environments using relative 3D ceiling features", IEEE, pp. 333-337 (Sep. 15, 2008).
Lee et al. "Statistically Optimized Sampling for Distributed Ray Tracing." ACM SIGGRAPH Computer Graphics, vol. 19, No. 3, ACM, pp. 61-67, 1985.
Li et al., "An improved RANSAC for 3D Point cloud plane segmentation based on normal distribution transformation cells," Remote sensing, V9: 433, pp. 1-16 (2017).
Likhachev, Maxim, and Dave Ferguson. "Planning Long dynamically feasible maneuvers for autonomous vehicles." The international journal of Robotics Reasearch 28.8 (2009): 933-945. (Year:2009).
Marder-Eppstein et al., "The Office Marathon: robust navigation in an indoor office environment," IEEE, 2010 International conference on robotics and automation, May 37, 2010, pp. 300-307.
McNaughton, Matthew, et al. "Motion planning for autonomous driving with a conformal spatiotemporal lattice." Robotics and Automation (ICRA), 2011 IEEE International Conference on. IEEE, 2011. (Year: 2011).
Meyersohn, "Walmart turns to robots and apps in stores", https://www.cnn.com/2018/12/07/business/walmart-robot-janitors-dotcom-store/index.html, Oct. 29, 2019.
Mitra et al., "Estimating surface normals in noisy point cloud data," International Journal of Computational geometry & applications, Jun. 8-10, 2003, pp. 322-328.
N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.
"Fair Billing with Automatic Dimensioning" pp. 1-4, undated, Copyright Mettler-Toledo International Inc.
"Plane Detection in Point Cloud Data" dated Jan. 25, 2010 by Michael Ying Yang and Wolfgang Forstner, Technical Report 1, 2010, University of Bonn.
"Swift Dimension" Trademark Omniplanar, Copyright 2014.
Ajmal S. Mian et al., "Three-Dimensional Model Based Object Recongnition and Segmentation in Cluttered Scences", IEEE Transactions on Pattern Analysis and Machine Intelligence, vol. 28, No. 10, Oct. 2006.
Batalin et al., "Mobile robot navigation using a sensor network," IEEE, International Conference on robotics and automation, Apr. 26, May 1, 2004, pp. 636-641.
Bazazian et al., "Fast and Robust Edge Extraction in Unorganized Point clouds," IEEE, 2015 International Conference on Digital Image Computing: Techniques and Applications (DICTA), Nov. 23-25, 2015, pp. 1-8.
Boden, "French retail chain to roll out NFC shelf edge labels to six hypermarkets" (Sep. 19, 2018), pp. 1-7.
Biswas et al. "Depth Camera Based Indoor Mobile Robot Localization and Navigation" Robotics and Automation (ICRA), 2012 IEEE International Conference on IEEE, 2012.
Bohm, Multi-Image Fusion for Occlusion-Free Façade Texturing, International Archives of the Photogrammetry, Remote Sensing and Spatial Information Sciences, pp. 867-872 (Jan. 2004).
Bristow et al., "A Survey of Iterative Learning Control", IEEE Control Systems, Jun. 2006, pp. 96-114.
Buenaposada et al. "Realtime tracking and estimation of plane pose" Proceedings of the ICPR (Aug. 2002) vol. II, IEEE pp. 697-700.
International Search Report and Written Opinion for International Patent Application No. PCT/IB2021/060948 dated Feb. 4, 2022.

(56) References Cited

OTHER PUBLICATIONS

Ni et al., "Edge Detection and Feature Line Tracing in 3D-Point Clouds by Analyzing Geometric Properties of Neighborhoods," Remote Sensing, V8 I9, pp. 1-20 (2016).
Norriof et al., "Experimental comparison of some classical iterative learning control algorithms", IEEE Transactions on Robotics and Automation, Jun. 2002, pp. 636-641.
Notice of allowance for U.S. Appl. No. 13/568,175 dated Sep. 23, 2014.
Notice of allowance for U.S. Appl. No. 13/693,503 dated Mar. 11, 2016.
Notice of allowance for U.S. Appl. No. 14/068,495 dated Apr. 25, 2016.
Notice of allowance for U.S. Appl. No. 14/518,091 dated Apr. 12, 2017.
Notice of allowance for U.S. Appl. No. 15/211,103 dated Apr. 5, 2017.
Olson, Clark F., et al. "Wide-Baseline Stereo Vision for terrain Mapping" in Machine Vision and Applications, Aug. 2010.
Oriolo et al., "An iterative learning controller for nonholonomic mobile Robots", the international Journal of Robotics Research, Aug. 1997, pp. 954-970.
Ostafew et al., "Visual Teach and Repeat, Repeat, Repeat: Iterative learning control to improve mobile robot path tracking in challenging outdoor environment", IEEE/RSJ International Conference on Intelligent robots and Systems, Nov. 2013, pp. 176.
Park et al., "Autonomous mobile robot navigation using passive rfid in indoor environment," IEEE, Transactions on industrial electronics, vol. 56, issue 7, pp. 2366-2373 (Jul. 2009).
Perveen et al. (An overview of template matching methodologies and its application, International Journal of Research in Computer and Communication Technology, v2n10, Oct. 2013) (Year: 2013).
Pivtoraiko et al., "Differentially constrained mobile robot motion planning in state lattices", journal of field robotics, vol. 26, No. 3, 2009, pp. 308-333.
Pratt W K Ed: "Digital Image processing, 10-image enhancement, 17-image segmentation", Jan. 1, 2001, Digital Image Processing: PIKS Inside, New York: John Wily & Sons, US, pp. 243-258, 551.
Puwein, J., et al."Robust Multi-view camera calibration for wide-baseline camera networks,"in IEEE Workshop on Applications of computer vision (WACV), Jan. 2011.
Rusu, et al. "How to incrementally register pairs of clouds," PCL Library, retrieved from internet on Aug. 22, 2016 [http://pointclouds.org/documentation/tutorials/pairwise_incremental_registration.php.
Rusu, et al. "Spatial Change detection on unorganized point cloud data," PCL Library, retrieved from internet on Aug. 19, 2016 [http://pointclouds.org/documentation/tutorials/octree_change.php].
Schnabel et al. "Efficient RANSAC for Point-Cloud Shape Detection", vol. 0, No. 0, pp. 1-12(1981).
Senthilkumaran, et al., "Edge Detection Techniques for Image Segmentation—A Survey of Soft Computing Approaches", International Journal of Recent Trends in Engineering, vol. 1, No. 2 (May 2009).
Szeliski, "Modified Hough Transform", Computer Vision. Copyright 2011, pp. 251-254. Retrieved on Aug. 17, 2017 [http://szeliski.org/book/drafts/SzeliskiBook_20100903_draft.pdf].
Tahir, Rabbani, et al., "Segmentation of point clouds using smoothness constraint," International Archives of Photogrammetry, Remote Sensing and Spatial Information Sciences 36.5 (Sep. 2006): 248-253.
Trevor et al., "Tables, Counters, and Shelves: Semantic Mapping of Surfaces in 3D," Retrieved from Internet Jul. 3, 2018 @ http://citeseerx.ist.psu.edu/viewdoc/download?doi=10.1.1.703.5365&rep=rep1&type=p.
Tseng, et al., "A Cloud Removal Approach for Aerial Image Visualization", International Journal of Innovative Computing, Information & Control, vol. 9, No. 6, pp. 2421-2440 (Jun. 2013).
Uchiyama, et al., "Removal of Moving Objects from a Street-View Image by Fusing Multiple Image Sequences", Pattern Recognition, 2010, 20th International Conference on, IEEE, Piscataway, NJ pp. 3456-3459 (Aug. 23, 2010).
United Kingdom Intellectual Property Office, "Combined Search and Examination Report" for GB Patent Application No. 1813580.6 dated Feb. 21, 2019.
United Kingdom Intellectual Property Office, Combined Search and Examination Report dated Jan. 22, 2016 for GB Patent Application No. 1417218.3.
United Kingdom Intellectual Property Office, Combined Search and Examination Report dated Jan. 22, 2016 for GB Patent Application No. 1521272.3.
United Kingdom Intellectual Property Office, Combined Search and Examination Report dated Mar. 11, 2015 for GB Patent Application No. 1417218.3.
United Kingdom Intellectual Property Office, Combined Search and Examination Report dated May 13, 2020 for GB Patent Application No. 1917864.9.
Varol Gul et al: "Product placement detection based on image processing", 2014 22nd Signal Processing and Communication Applications Conference (SIU), IEEE, Apr. 23, 2014.
Varol Gul et al: "Toward Retail product recognition on Grocery shelves", Visual Communications and image processing; Jan. 20, 2004; San Jose, (Mar. 4, 2015).
Weber et al., "Methods for Feature Detection in Point clouds," visualization of large and unstructured data sets—IRTG Workshop, pp. 90-99 (2010).
Zhao Zhou et al.: "An Image contrast Enhancement Algorithm Using PLIP-based histogram Modification", 2017 3rd IEEE International Conference on Cybernetics (CYBCON), IEEE, (Jun. 21, 2017).
Ziang Xie et al., "Multimodal Blending for High-Accuracy Instance Recognition", 2013 IEEE RSJ International Conference on Intelligent Robots and Systems, p. 2214-2221.
Fan Zhang et al., "Parallax-tolerant Image Stitching", 2014 Computer Vision Foundation, pp. 4321-4328.
Kaimo Lin et al., "SEAGULL: Seam-guided Local Alignment for Parallax-tolerant Image Stitching", Retrieved on Nov. 16, 2020 [http://publish.illinois.edu/visual-modeling-and-analytics/files/2016/08/Seagull.pdf].
Julio Zaragoza et al., "As-Projective-As-Possible Image Stitching with Moving DLT", 2013 Computer Vision Foundation, pp. 2339-2346.
Zeng et al., Multi-view Self Supervised Deep Learning for 6D Pose Estimation in the Amazon Picking Challenge, May 7, 2017. Retrieved on Nov. 16, 2019 [https://arxiv.org/pdf/1609.09475.pdf].
Zhang et al., "Mobile computing and industrial augmented reality for real-time data access", Emerging Technologies and Factory Automation, 2001, 8th IEEE International Conference on Oct. 15-18, 2001, pp. 583-588, vol. 2.
A Gruen et al., Automatic Reconstruction and Visualization of a Complex Buddha Tower of Bayon, Angkor, Cambodia, Sep. 2001, pp. 289-301.
Alshwabkeh Y. et al., "Automatic Muiti-Image Photo-Texturing of Compiex 3D Scenes", CIPA 2005 XX International Symposium; Sep. 26, 2005, pp. 1-6.

* cited by examiner

1100

PARALLAX-TOLERANT PANORAMIC IMAGE GENERATION

BACKGROUND

Environments in which objects are managed, such as retail facilities, warehousing and distribution facilities, and the like, may store such objects in regions such as aisles of shelf modules or the like. For example, a retail facility may include objects such as products for purchase, and a distribution facility may include objects such as parcels or pallets. A mobile automation apparatus may be deployed within such facilities to perform tasks at various locations. For example, a mobile automation apparatus may be deployed to capture data representing support structures in a retail facility for use in detecting product status information. The mixed depth of objects on the support structures may vary along the aisle, however, which may complicate image stitching when generating a panoramic image of the support structure and reduce the accuracy of status information detected from the captured data.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
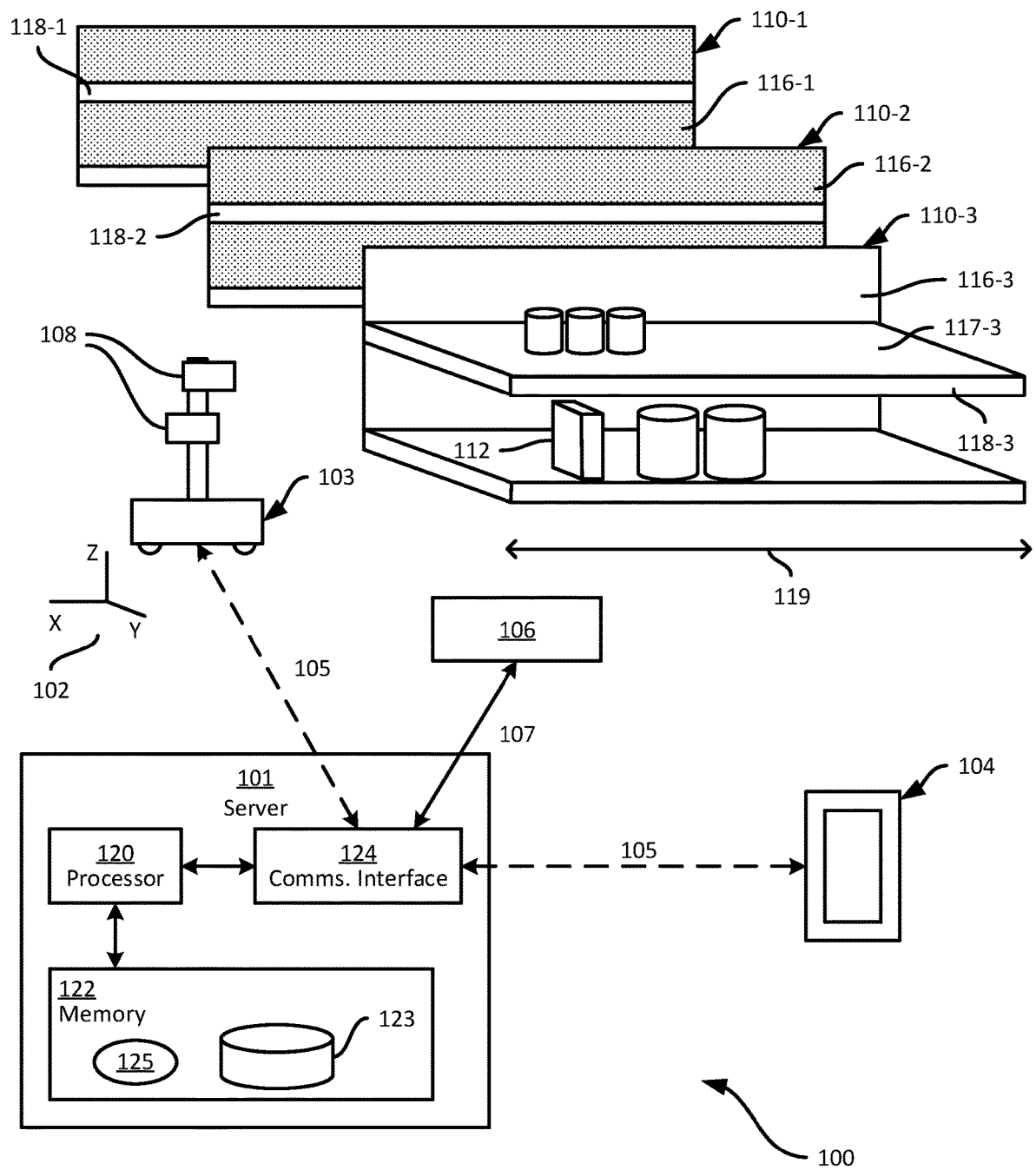
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method, comprising: obtaining a point cloud captured by a depth sensor, the point cloud representing a support structure bearing a set of objects; obtaining a set of images of the support structure and the set of objects, the set of images captured by an image sensor from a plurality of positions alongside a length of the support structure; generating a mesh structure using the point cloud, the mesh structure including a plurality of cells and representing a surface of the support structure and the set of objects; for each cell in the mesh structure, selecting an image from the set of images and projecting the selected image to the cell; and generating an orthographic projection of the mesh structure onto a shelf plane of the support structure.

Additional examples disclosed herein are directed to a computing device, comprising: a memory; a processor interconnected with the memory, the processor configured to: obtain a point cloud representing a support structure bearing a set of objects; obtain a set of images of the support structure and the set of objects, the set of images captured from a plurality of positions alongside a length of the support structure; generate a mesh structure using the point cloud, the mesh structure including a plurality of cells and representing a surface of the support structure and the set of objects; for each cell in the mesh structure, select an image from the set of images and project the selected image to the cell; and generate an orthographic projection of the mesh structure onto a shelf plane of the support structure.

FIG. 1 depicts a mobile automation system 100 in accordance with the teachings of this disclosure. The system 100 includes a server 101 in communication with at least one mobile automation apparatus 103 (also referred to herein simply as the apparatus 103) and at least one client computing device 104 via communication links 105, illustrated in the present example as including wireless links. In the present example, the links 105 are provided by a wireless local area network (WLAN) deployed via one or more access points (not shown). In other examples, the server 101, the client device 104, or both, are located remotely (i.e. outside the environment in which the apparatus 103 is deployed), and the links 105 therefore include wide-area networks such as the Internet, mobile networks, and the like. The system 100 also includes a dock 106 for the apparatus 103 in the present example. The dock 106 is in communication with the server 101 via a link 107 that in the present example is a wired link. In other examples, however, the link 107 is a wireless link.

The client computing device 104 is illustrated in FIG. 1 as a mobile computing device, such as a tablet, smart phone or the like. In other examples, the client device 104 is implemented as another type of computing device, such as a desktop computer, a laptop computer, another server, a kiosk, a monitor, and the like. The system 100 can include a plurality of client devices 104 in communication with the server 101 via respective links 105.

The system 100 is deployed, in the illustrated example, in a retail facility including a plurality of support structures such as shelf modules 110-1, 110-2, 110-3 and so on (collectively referred to as shelf modules 110 or shelves 110, and generically referred to as a shelf module 110 or shelf 110—this nomenclature is also employed for other elements discussed herein). Each shelf module 110 supports a plurality of products 112. Each shelf module 110 includes a shelf back 116-1, 116-2, 116-3 and a support surface (e.g. support surface 117-3 as illustrated in FIG. 1) extending from the shelf back 116 to a shelf edge 118-1, 118-2, 118-3. A variety of other support structures may also be present in the facility, such as pegboards and the like.

The shelf modules 110 (also referred to as sub-regions of the facility) are typically arranged in a plurality of aisles (also referred to as regions of the facility), each of which includes a plurality of modules 110 aligned end-to-end. In such arrangements, the shelf edges 118 face into the aisles, through which customers in the retail facility, as well as the apparatus 103, may travel. As will be apparent from FIG. 1, the term "shelf edge" 118 as employed herein, which may also be referred to as the edge of a support surface (e.g., the support surfaces 117) refers to a surface bounded by adjacent surfaces having different angles of inclination. In the example illustrated in FIG. 1, the shelf edge 118-3 is at an angle of about ninety degrees relative to the support surface 117-3 and to the underside (not shown) of the support surface 117-3. In other examples, the angles between the shelf edge 118-3 and the adjacent surfaces, such as the support surface 117-3, is more or less than ninety degrees.

The apparatus 103 is equipped with a plurality of navigation and data capture sensors 108, such as image sensors (e.g. one or more digital cameras) and depth sensors (e.g. one or more Light Detection and Ranging (LIDAR) sensors, one or more depth cameras employing structured light patterns, such as infrared light, or the like). The apparatus 103 is deployed within the retail facility and, via communication with the server 101 and use of the sensors 108, navigates autonomously or partially autonomously along a length 119 of at least a portion of the shelves 110.

While navigating among the shelves 110, the apparatus 103 can capture images, depth measurements and the like, representing the shelves 110 (generally referred to as shelf data or captured data). Navigation may be performed according to a frame of reference 102 established within the retail facility. The apparatus 103 therefore tracks its pose (i.e. location and orientation) in the frame of reference 102.

The server 101 includes a special purpose controller, such as a processor 120, specifically designed to control and/or assist the mobile automation apparatus 103 to navigate the environment and to capture data. The processor 120 is interconnected with a non-transitory computer readable storage medium, such as a memory 122, having stored thereon computer readable instructions for performing various functionality, including control of the apparatus 103 to navigate the modules 110 and capture shelf data, as well as post-processing of the shelf data. The memory 122 can also store data for use in the above-mentioned control of the apparatus 103, such as a repository 123 containing a map of the retail environment and any other suitable data (e.g. operational constraints for use in controlling the apparatus 103, data captured by the apparatus 103, and the like).

The memory 122 includes a combination of volatile memory (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In some embodiments, the processor 120 is implemented as one or more central processing units (CPUs) and/or graphics processing units (GPUs).

The server 101 also includes a communications interface 124 interconnected with the processor 120. The communications interface 124 includes suitable hardware (e.g. transmitters, receivers, network interface controllers and the like) allowing the server 101 to communicate with other computing devices—particularly the apparatus 103, the client device 104 and the dock 106—via the links 105 and 107. The links 105 and 107 may be direct links, or links that traverse one or more networks, including both local and wide-area networks. The specific components of the communications interface 124 are selected based on the type of network or other links that the server 101 is required to communicate over. In the present example, as noted earlier, a wireless local-area network is implemented within the retail facility via the deployment of one or more wireless access points. The links 105 therefore include either or both wireless links between the apparatus 103 and the mobile device 104 and the above-mentioned access points, and a wired link (e.g. an Ethernet-based link) between the server 101 and the access point.

The processor 120 can therefore obtain data captured by the apparatus 103 via the communications interface 124 for storage (e.g. in the repository 123) and subsequent processing (e.g. to detect objects such as shelved products in the captured data, and detect status information corresponding to the objects). The server 101 maintains, in the memory 122, an application 125 executable by the processor 120 to perform such subsequent processing. In particular, as discussed in greater detail below, the server 101 is configured, via execution of the instructions of the application 125 by the processor 120, to generate a panoramic image of a shelf structure, such as one of the shelf modules 110 along the length 119.

The server 101 may also transmit status notifications (e.g. notifications indicating that products are out-of-stock, in low stock or misplaced) to the client device 104 responsive to the determination of product status data. The client device 104 includes one or more controllers (e.g. central processing units (CPUs) and/or field-programmable gate arrays (FPGAs) and the like) configured to process (e.g. to display) notifications received from the server 101.

Figure 2:
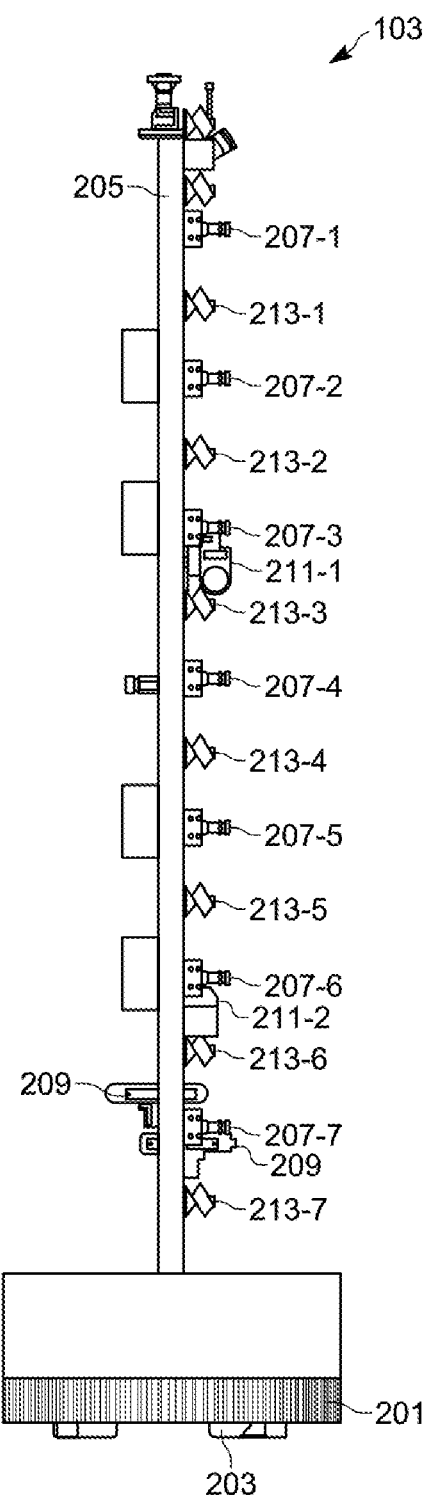
FIG. 2 is a side view of a mobile automation apparatus in the system of FIG. 1.

Turning now to FIG. 2, the mobile automation apparatus 103 is shown in greater detail. The apparatus 103 includes a chassis 201 containing a locomotive assembly 203 (e.g. one or more electrical motors driving wheels, tracks or the like). The apparatus 103 further includes a sensor mast 205 supported on the chassis 201 and, in the present example, extending upwards (e.g., substantially vertically) from the chassis 201. The mast 205 supports the sensors 108 mentioned earlier. In particular, the sensors 108 include at least one imaging sensor 207, such as a digital camera. In the present example, the mast 205 supports seven digital cameras 207-1 through 207-7 oriented to face the shelves 110.

The mast 205 also supports at least one depth sensor 209, such as a 3D digital camera capable of capturing both depth data and image data. The apparatus 103 also includes additional depth sensors, such as LIDAR sensors 211. In the present example, the mast 205 supports two LIDAR sensors 211-1 and 211-2. As shown in FIG. 2, the cameras 207 and the LIDAR sensors 211 are arranged on one side of the mast 205, while the depth sensor 209 is arranged on a front of the mast 205. That is, the depth sensor 209 is forward-facing (i.e. captures data in the direction of travel of the apparatus 103), while the cameras 207 and LIDAR sensors 211 are side-facing (i.e. capture data alongside the apparatus 103, in a direction perpendicular to the direction of travel). In other examples, the apparatus 103 includes additional sensors, such as one or more RFID readers, temperature sensors, and the like.

The mast 205 also supports a plurality of illumination assemblies 213, configured to illuminate the fields of view of the respective cameras 207. The illumination assemblies 213 may be referred to collectively as an illumination subsystem. That is, the illumination assembly 213-1 illuminates the field of view of the camera 207-1, and so on. The cameras 207 and lidars 211 are oriented on the mast 205 such that the fields of view of the sensors each face a shelf 110 along the length 119 of which the apparatus 103 is traveling. The apparatus 103 is configured to track a pose of the apparatus 103 (e.g. a location and orientation of the center of the chassis 201) in the frame of reference 102, permitting data captured by the apparatus 103 to be registered to the frame of reference 102 for subsequent processing.

Figure 3:
FIG. 3 is a block diagram of certain internal components of the server of FIG. 1.
Figure 3:
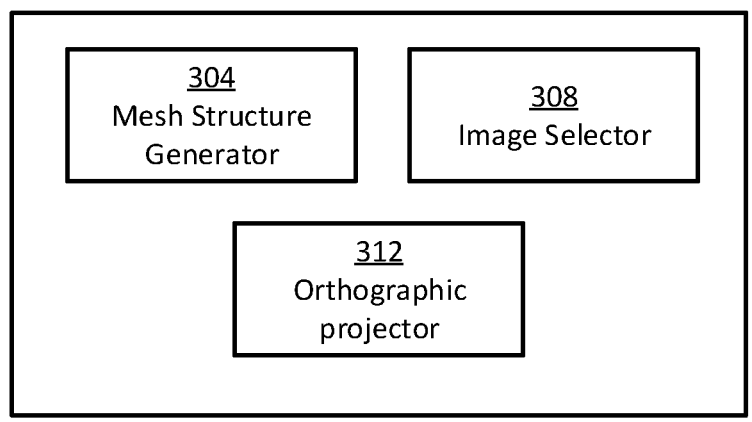

Turning to FIG. 3, certain components of the application 125 are illustrated. As will be apparent to those skilled in the art, the application 125 can also be implemented as a suite of distinct applications in other examples. Further, some or all of the modules described below can be implemented via distinct control hardware such as one or more ASICs and/or FPGAs.

The application 125 includes a mesh structure generator 304 that is configured to generate a mesh structure or a tessellation based on the point cloud data. The mesh structure is a plurality of polygonal cells which represent the surface profile of the support structure and the objects on the support structure captured by the point cloud data.

The application 125 also includes an image selector 308 that is configured to select an image for projection onto a cell or a group of cells of the mesh. In particular, the image selector 308 may use the point cloud data to obtain the 3D coordinates of the cell or group of cells, and use the image data to identify one or more images which map to the identified 3D coordinates of the cell or group of cells. For example, the image selector 308 may use a mapping of the 2D images onto the 3D point cloud (e.g., determined by another component of the server 101 or a separate computing device) to select images to map to the cell or group of cells. In particular, the image selector 308 selects a single image for each cell or group of cells, for example, based on the projection area of the cell within the image, the number of cells covered by the image, reduction of glare or other image defects, or the like. The image selector 308 may additionally project the selected image onto the cell or group of cells.

The application 125 also includes an orthographic projector 312 that is configured to generate an orthographic projection of the mesh structure. In particular, once each cell of the mesh structure has an image projected onto it, the orthographic projection may represent a panoramic image of the support structure. That is, when the orthographic projector projects the mesh structure onto a shelf plane, such as a plane corresponding to the shelf back of the support structure, a plane including the shelf edges of shelves of the support structure, or another plane parallel to the XZ-plane, as defined by the frame of reference 102, the resulting orthographic projection represents a panoramic image of the shelf structure as viewed from the aisle along the length of the support structure. Notably, by the nature of the orthographic projection, depth and perspective effects are lost (i.e., objects further away will appear the same size as closer objects).

Figure 4:
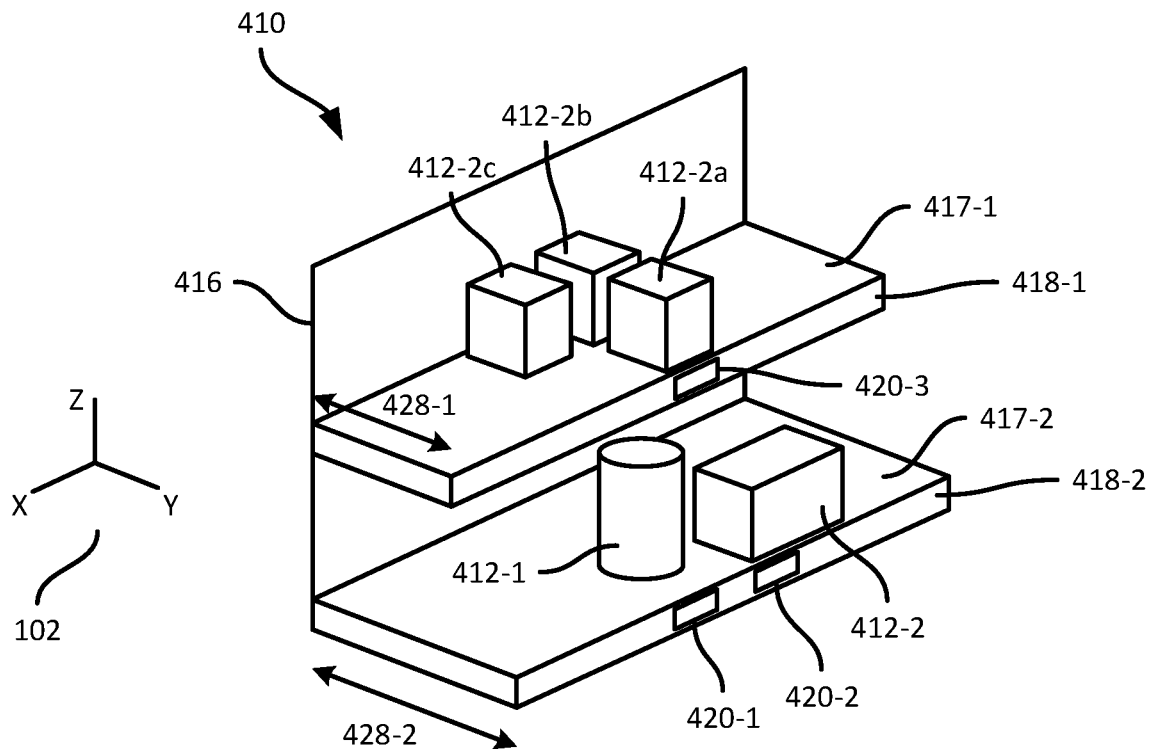
FIG. 4 is a diagram of a shelf module, shown in perspective and from the side.
Figure 4:
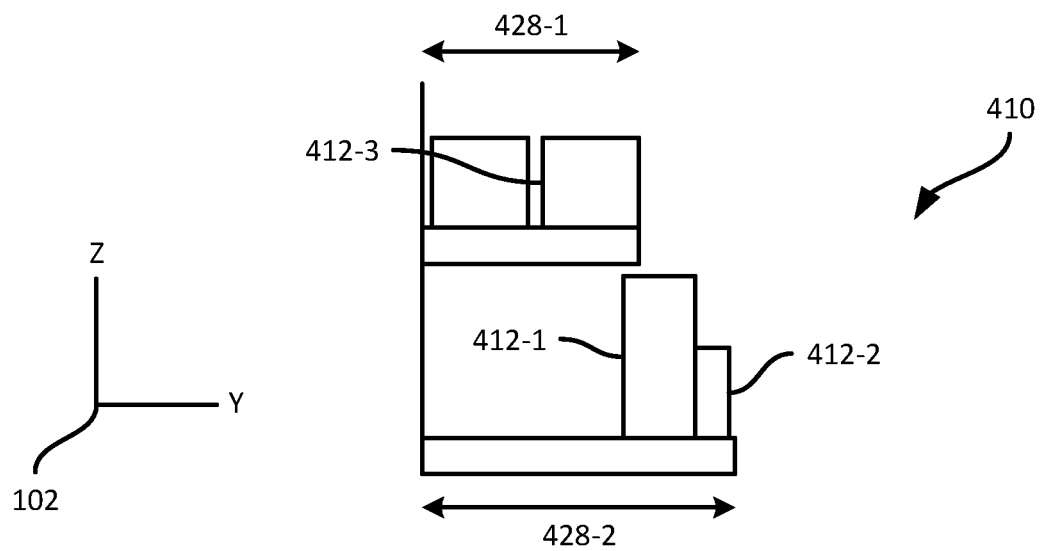

FIG. 4 illustrates a module 410 including two shelves. As discussed in connection with the modules 110 in FIG. 1, the shelves of the module 410 includes support surfaces 417-1 and 417-2 extending from a shelf back 416 to respective shelf edges 418-1 and 418-2. The shelf edge 418-2 supports two labels 420-1 and 420-2, corresponding to products 412-1 and 412-2, respectively. The shelf edge 418-1, meanwhile, supports a label 420-3 corresponding to products 412-3, of which three (412-3a, 412-3b, and 412-3c) are depicted.

FIG. 4 also includes a side view of the module 410, showing that the shelf edges 418-1 and 418-2 are at a different depth (i.e. position along the Y axis of the frame of reference 102) than the shelf edge 418-3. Additionally, the products 412-1, 412-2 and 412-3 are at different depths from one another, and the products 412-3 are at different depths amongst themselves. The different depths of the shelf edges 418 and the products 412 can negatively affect the accuracy of image stitching because the difference in depths can cause a parallax effect based on the different apparent distances between objects when viewed from different angles.

Some solutions may use grid distortion to align images for parallax-tolerant image stitching, however the grid distortion is particularly visible in straight lines, such as shelves and other salient structures, and hence is impractical to generate a panoramic image to be used for object detection.

The server 101 is therefore configured, as described below in greater detail, to generate a panoramic image using image projection onto a mesh structure and an orthographic projection to reduce parallax effects of the panoramic image generation while avoiding grid distortion.

Figure 5:
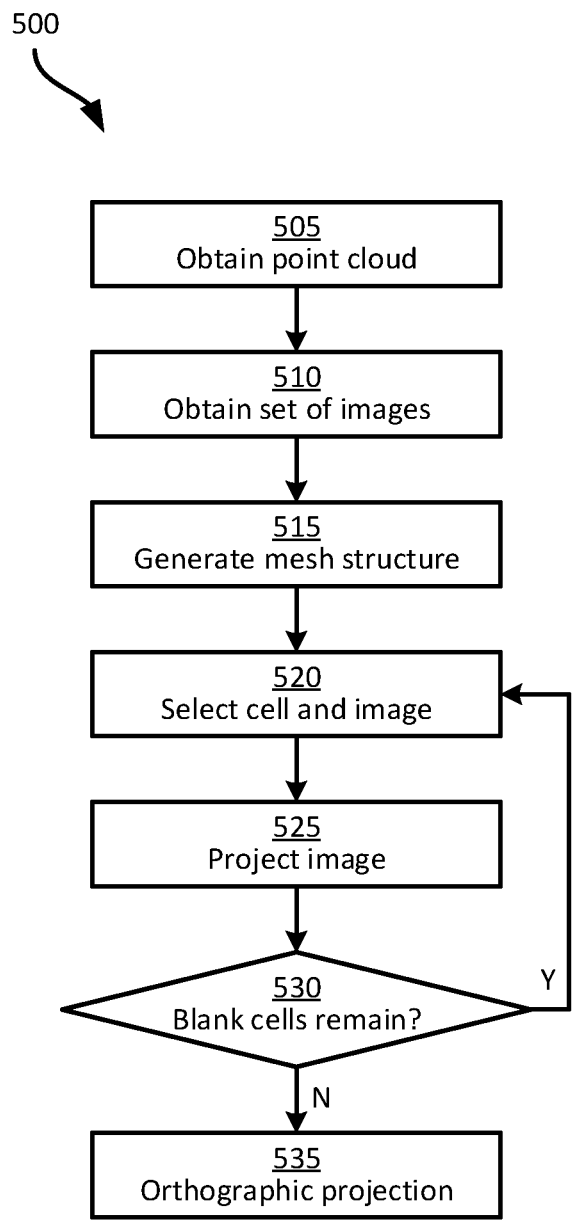
FIG. 5 is a flowchart of a method of generating a panoramic image of a support structure.

FIG. 5 shows a flowchart of a method 500 of generating a panoramic image of a support structure, such as the module 410. The method 500 as described below is performed by the server 101, and in particular by the application 125. In other examples, however, at least some of the functionality implemented via the method 500 can be performed by another computing device, such as the apparatus 103.

At block 505, the server 101 is configured to obtain depth data (i.e., one or more point clouds) representing a support structure. The point cloud includes a plurality of points with coordinates defined in three dimensions, e.g. according to the frame of reference 102, captured by the apparatus 103 e.g. while traversing an aisle including support structures such as the module 410. A plurality of individual point clouds can be obtained at block 505, however in the discussion below a single point cloud will be discussed for clarity of illustration. The single point cloud can be produced from multiple individual point cloud captures by the apparatus 103. The point cloud obtained at block 505 may be retrieved from the repository 123, for example.

At block 510, the server is configured to obtain image data representing the support structures. The image data includes a plurality of 2D images previously captured by the apparatus 103, during the above-mentioned traversal of the support structures. That is, the plurality of images is captured from a plurality of positions in the aisle, alongside a length of the module 410. In particular, the plurality of images may include multiple views of the module 410 such that each object is shown in more than one image, including from different angles.

Figure 6:
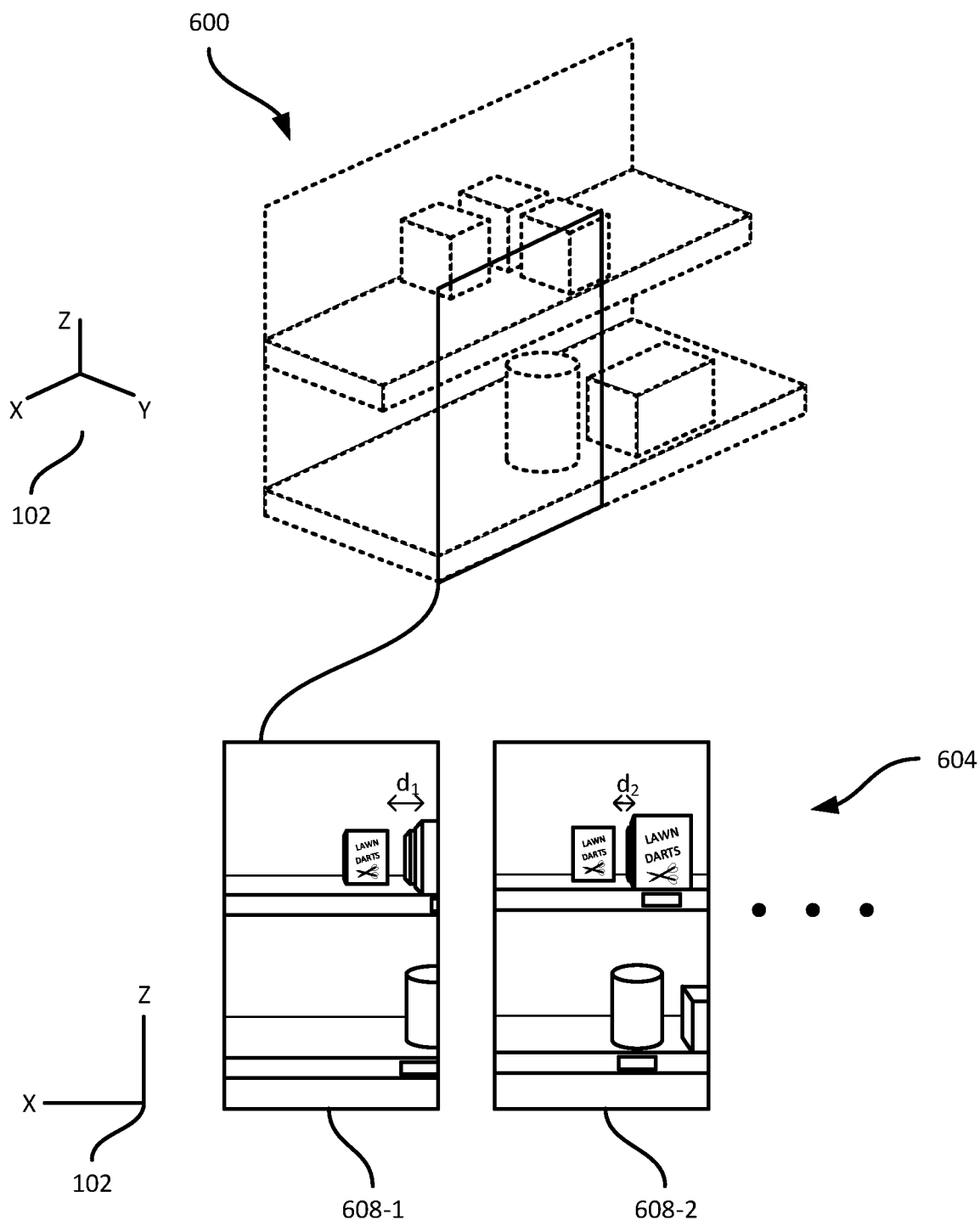
FIG. 6 is a diagram illustrating data captured via an example performance of blocks 505 and 510 of the method of FIG. 5.

FIG. 6 illustrates an example point cloud 600 and an example set 604 of images obtained at block 505. As is evident from FIG. 6, the point cloud 600 depicts the module 410. The labels 420 are not shown in the point cloud 600, because they are coplanar with the shelf edges 418 in this example, and therefore may not be distinguishable from the shelf edges 418 from the point cloud 600 alone. The set 604 of images also depict the module 410, with each image corresponding to a particular portion of the module 410 as the apparatus traverses the length of the module 410. An example portion corresponding to the first image 608-1 in the set 604 is illustrated. As seen in FIG. 6, the images 608-1 and 608-2 overlap, such that each object (e.g., products 412) are shown in more than one image. Further, as can be seen, different portions of the products 412 are visible in each of the images, at different angles and with different perspectives. The perspective further affects the apparent distance $d_1$ and $d_2$ between the products 412-3a and 412-3c. When panoramic images are created by stitching together the images 608-1 and 608-2, the differences between the apparent distances $d_1$ and $d_2$ creates a parallax effect in the panoramic image.

Returning to FIG. 5, following acquisition of the set of images and the point cloud, at block 515, the server 101 and in particular the mesh generator 304 is configured to use the point cloud to generate a mesh structure (also referred to interchangeably as a tessellation or a surface reconstruction). The mesh structure may be defined by a series vertices, edges and faces. In particular, the faces may be polygonal cells. The mesh structure generally represents the surfaces of the support structure (e.g., the module 410) and the objects supported on the support structure (e.g., the products 412). The polygonal cells may be triangles, quadrilaterals, or other suitable polygons. In some examples, the mesh generator 304 may employ a surface reconstruction algorithm specifically optimized for orthographic projections. For example, the mesh generator 304 may apply a Poisson reconstruction or a mean least squares (MLS) reconstruction. In other examples, the mesh generator 304 may generate a depth map, subdivide it into N×N pixel squares, and define two triangular cells from each square.

Figure 7:
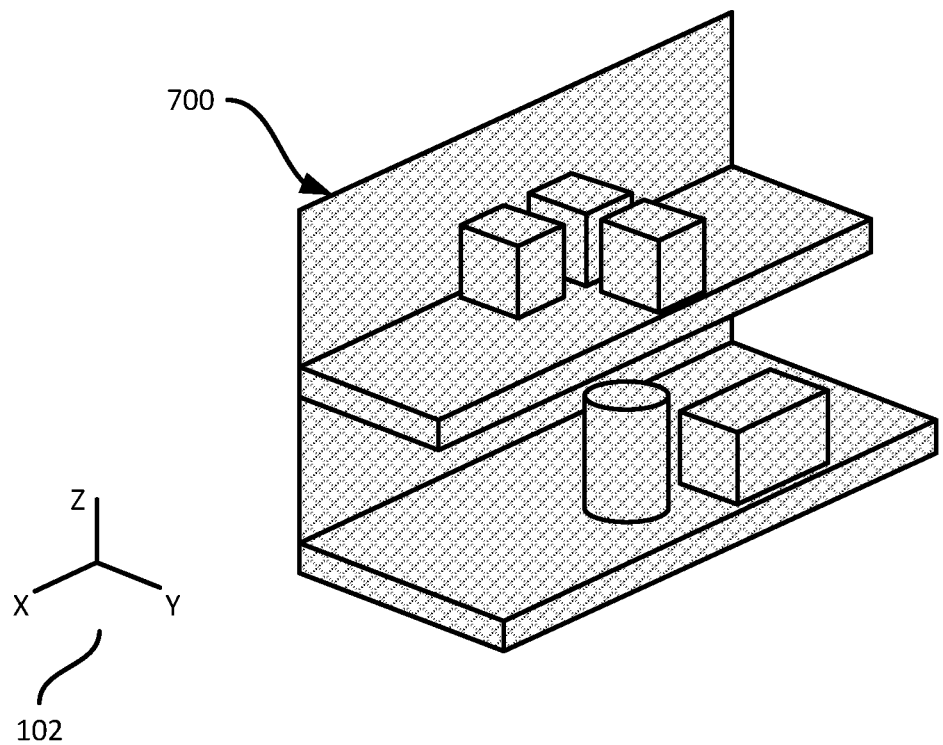
FIG. 7 is a diagram illustrating data obtained via a performance of block 515 of the method of FIG. 5.

FIG. 7 illustrates an example mesh structure 700. The mesh structure 700 may be derived from the point cloud 600 and depicts the module 410. The mesh structure represents the surfaces of the module 410, including the surfaces of the products 412, the shelves 417, including the shelf edges 418, and the shelf back 416. As with the point cloud 600, the labels 420 are not shown because they are coplanar with the shelf edges 418 and therefore may not be distinguishable from the shelf edges 418. The mesh structure 700 may employ suitable polygonal shapes, including irregular shapes, to represent the surfaces of the module 410 and the products 412.

Returning again to FIG. 5, at block 520, the server 101, and in particular the image selector 308, is configured to select a polygonal cell of the mesh structure which does not yet have an image mapped to it and select an image to apply to the cell. In some examples, the server 101 may identify a plurality of neighboring cells of the selected cell in the mesh structure which form group of cells representing at least a portion of a surface. The server 101 may then select a single image to apply to the group of cells. The server 101 may select the image to apply based on the projection area of the selected cell in the image, the pose of the image sensor during capture of the image (i.e., to determine whether the cell is visible in the image), the sharpness of the image, the number of cells covered by the image, reduction of glare or other image defects, or the like.

Figure 8:
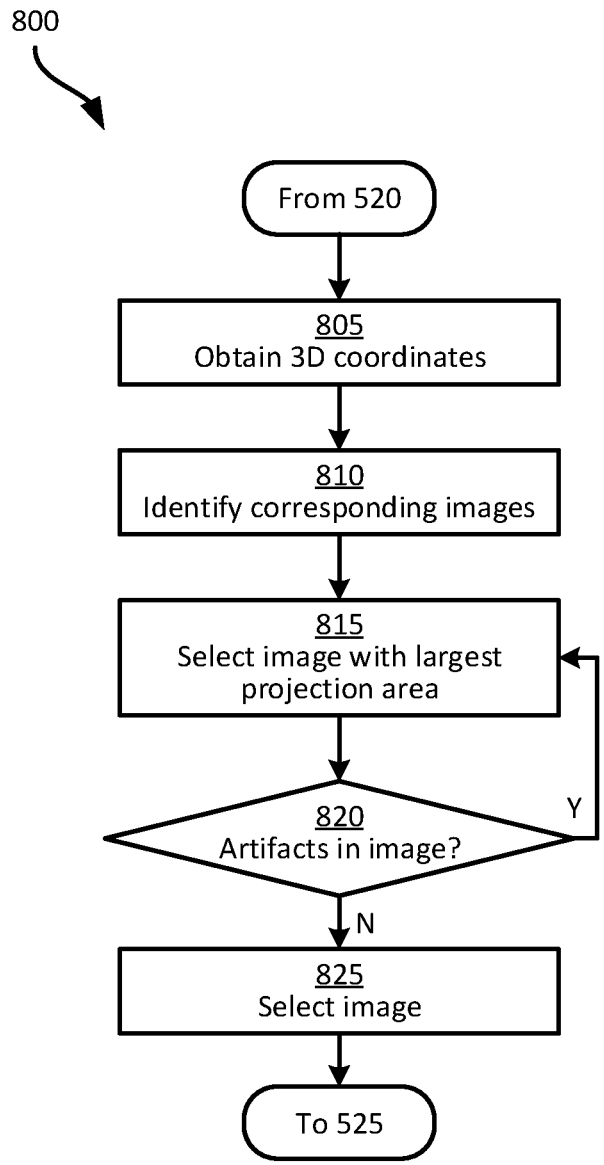
FIG. 8 is a flowchart of a method of performing block 520 of the method of FIG. 5.

For example, FIG. 8 illustrates a method 800 of selecting an image to map to a cell of the mesh structure.

At block 805, having selected a cell to map an image to, the server 101 is configured to obtain the 3D coordinates of the cell using the point cloud. For example, the since the mesh structure may define the vertices of each cell by their respective 3D coordinates, the server 101 may simply retrieve the 3D coordinates defined in the mesh structure.

At block 810, the server 101 is configured to identify a subset of the images captured by the apparatus 103 which correspond to the 3D coordinates of the cell, as defined by the mesh structure. For example, the server 101 may map the set 604 of images onto the 3D point cloud and store an association between the images and portions of the images and the 3D point cloud. Accordingly, the mapping may be retrieved from the repository 123, for example. An image may then be determined to correspond to the 3D coordinates of the cell when the image is mapped to the 3D coordinates of the cell (i.e., includes image data for the cell).

At block 815, the server 101 selects the image having the largest projection area for the region corresponding to the selected cell. This may generally correspond to an image captured from an angle substantially perpendicular to the cell. For example, for a cell corresponding to an outward facing surface of a product, the image with the largest projection area may correspond to an image captured at a position substantially directly in front of the product. Additionally, an image captured from a closer distance to the cell may generally have a larger projection area for a given cell than an image captured from a further distance from the cell.

At block 820, the server 101 determines whether the selected image has glare or other unwanted image artifacts or distortions (e.g., discoloration, blur, or the like) within the region corresponding to the selected cell.

If the determination at block 820 is affirmative, the server 101 returns to block 815 to select the image having the next largest projection area for the region corresponding to the selected cell. The server 101 may therefore iterate through the images to select the image with the largest projection area with few to no distortions in the region corresponding to the selected cell. In some examples, if all the images have some distortions, the server 101 may be configured to select the image with the least amount of distortion.

If the determination at block 820 is negative, the server 101 proceeds to block 825 to select the image. Thus, when the resulting panoramic image is generated, each cell may be represented by the image with the largest projection area of the cell and fewest artifacts or other distortions to allow for more robust processing of the products and the labels on the support structure. Having selected the image, the server 101 may proceed to block 525 of the method 500.

Figure 9:
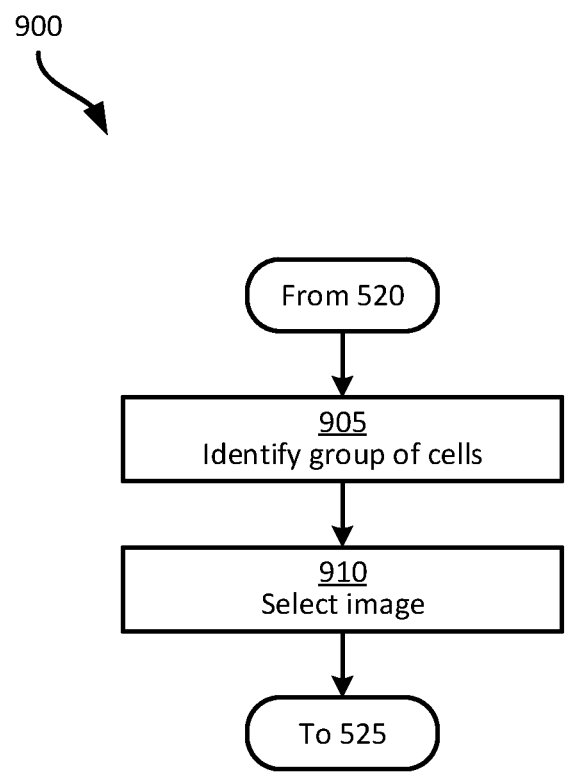
FIG. 9 is a flowchart of a method of performing block 520 of the method of FIG. 5.

In some examples, rather than selecting an image for a single cell, the server 101 may be configured to select an image to be applied to a group of cells to increase continuity of an image on a particular surface. For example, FIG. 9 illustrates a method 900 of selecting an image for a group of cells of the mesh structure.

The method 900 is initiated at block 905 after selecting a cell to map an image to at block 520. At block 905, the server 101 may be configured to identify a group of neighboring cells for the selected cell. The group of cells may generally correspond to a surface or a portion of a surface represented by the selected cell. For example, if the cell selected at block 520 corresponds to a region of a front surface of one of the products 412-3, the group of cells identified at block 905 may correspond to a larger region of or substantially the entire front surface of the product 412-3. In particular, based on the image selection, as described below, the group of cells may be grouped on a surface to minimize jumps in image selection and maximize image quality for each of the cells in the group. The group of cells may be selected from cells in the mesh structure which do not yet have a mapped image.

At block 910, the server 101 selects an image to map to the group of cells. For example, the server 101 may select an image based on by combining independently selected optimal images for each cell in the group of cells. For example, the server 101 may independently identify, for each cell in the group, one or more suitable images for use in mapping. The server 101 may then select the image which is identified as a suitable image for the highest proportion of cells in the group (i.e., the highest voted image). That is, the server 101 may obtain the 3D coordinates of each of the cells in the group of cells and select the image which corresponds to the highest proportion of the cells based on the 3D coordinates and the image mapping to the point cloud. In other examples, the voting may be weighted for each cell based on a ranking of the suitable images and/or the presence of undesirable artifacts or distortions.

As will be appreciated, in some examples, the selection of the group of cells at block 905 and the selection of the image to map at block 910 may be performed simultaneously and in consideration of one another, for example via the Potts model. For example, after independently identifying, for each cell in the group, one or more suitable images for use in mapping, including a highest ranked (e.g., an image having the largest projection area for the particular cell), the server 101 may apply a regularization term that penalizes jumps (i.e., different image selections) between adjacent cells. Thus, the selected group of cells may be tuned so that a maximum number of cells is covered by the image and jumps of selected images between cells is minimized. Thus, the server 101 may obtain a global solution to optimize image quality for each individual cell while providing regularization in the image selection between cells.

Returning to FIG. 5, at block 525, the server 101, and in particular the image selector 308, is configured to project the image onto the selected cell. The projection of the selected image onto the selected cell allows the server 101 to identify a portion of the image corresponding to the cell. The portion of the image corresponding to the cell may then be stored in association with the cell. That is, the mesh structure may be updated to define the vertices, edges, and face of each cell, as well as image data for the portion of the image projected onto the cell.

Figure 10:
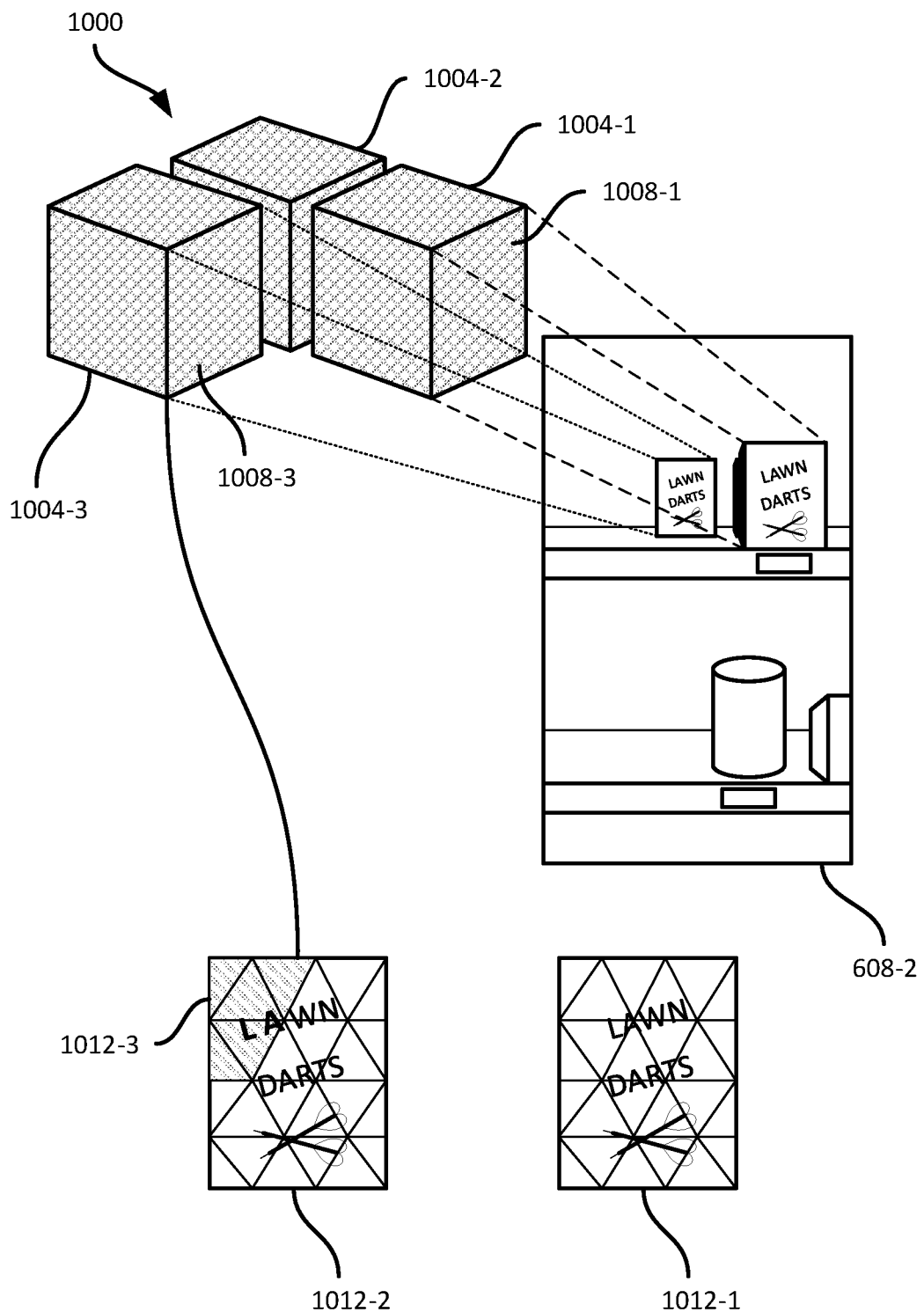
FIG. 10 is a diagram illustrating an example performance of block 525 of the method of FIG. 5.

For example, FIG. 10 illustrates an example performance of the selection of an image for a cell at block 520 and the projection of the image onto the cell at block 525 is depicted.

In particular, a portion 1000 of the mesh structure 700 is depicted. The portion 1000 includes sub-portions 1004-1, 1004-2 and 1004-3 corresponding to each of the products 412-2a, 412-2b and 412-2c, respectively.

For example, the server 101 may select a cell corresponding to the sub-portion 1004-1. Based on a correspondence of the 3D coordinates of the cell, the server 101 may identify a group of cells corresponding to a front face 1008-1 of the sub-portion 1004-1 as a group of cells to be mapped together. That is, since the group of cells corresponding to the front face 1008-1 represent a single continuous surface, it may be advantageous to map a single image to as many of them as possible for continuity of the image on the surface (e.g., to minimize the number of jumps between adjacent cells). The server 101 may identify the front face 1008-1 as corresponding to the front face of the product 412-2a. Accordingly, the server 101 may select the image 608-2 which includes the entirety of the front face of the product 412-2a as the selected image to map to the front face 1008-1. The server 101 may then project the portion of the image 608-2 corresponding to the front face 1008-1 onto the front face 1008-1. The server 101 may update the mesh structure to be defined not only by the edges, vertices and faces of the cells corresponding to the front face 1008-1, but also by the portion of the image 608-2 projected onto the group of cells. That is, the mesh structure may be updated with a mapped portion 1012-1 defined by the group of cells of the front face 1008-1 and the image projected thereon.

Similarly, the server 101 may select a cell corresponding to the sub-portion 1004-3 and based on the correspondence of the 3D coordinates of the cell, the server 101 may identify a group of cells corresponding to a front face 1008-3 of the sub-portion 1004-3 as a group of cells to be mapped together. The server 101 may then select the image 608-2 which corresponds to a more direct view of the front face of the product 412-2c as the selected image to map to the front face 1008-3. The server 101 may additionally identify glare or another image artifact in the image 608-2 and hence may additionally select the image 608-1 for a portion of the group of cells corresponding to the front face 1008-3 (e.g., on a further iteration of the method 500). Accordingly, the server 101 may update the mesh structure to include mapped portions 1012-2 and 1012-3 defined by the groups of cells and having portions of both of the images 608 projected thereon.

Returning again to FIG. 5, at block 530, the server 101 determines whether any blank or unmapped cells remain in the mesh structure. If the determination at block 530 is affirmative, the server 101 returns to block 520 to select another unmapped cell and select an image.

If the determination at block 530 is negative, the server 101 proceeds to block 535. At block 535, the server 101, and in particular the orthographic projector 312 generates an orthographic projection. Since the mesh structure is generated based on point cloud data taken along the length of the support structure, the entire support structure is captured in the mesh structure. Accordingly, the orthographic projector 312 may project the mesh structure onto a shelf plane (i.e., a plane parallel to the XZ-plane) to similarly capture the entirety of the support structure along its length. Further, since the mesh structure is updated with image data corresponding to each cell of the mesh structure, the orthographic projection includes the image data for the support structure, and therefore forms a panoramic image of the support structure along its length.

In some examples, prior to generating the orthographic projection, the server 101 may apply color adjustments, balancing, smoothing of seams or other image processing filters on the mapped mesh structure (i.e., the mesh structure with the images projected thereon) to improve the quality of the resulting orthographic projection.

Figure 11:
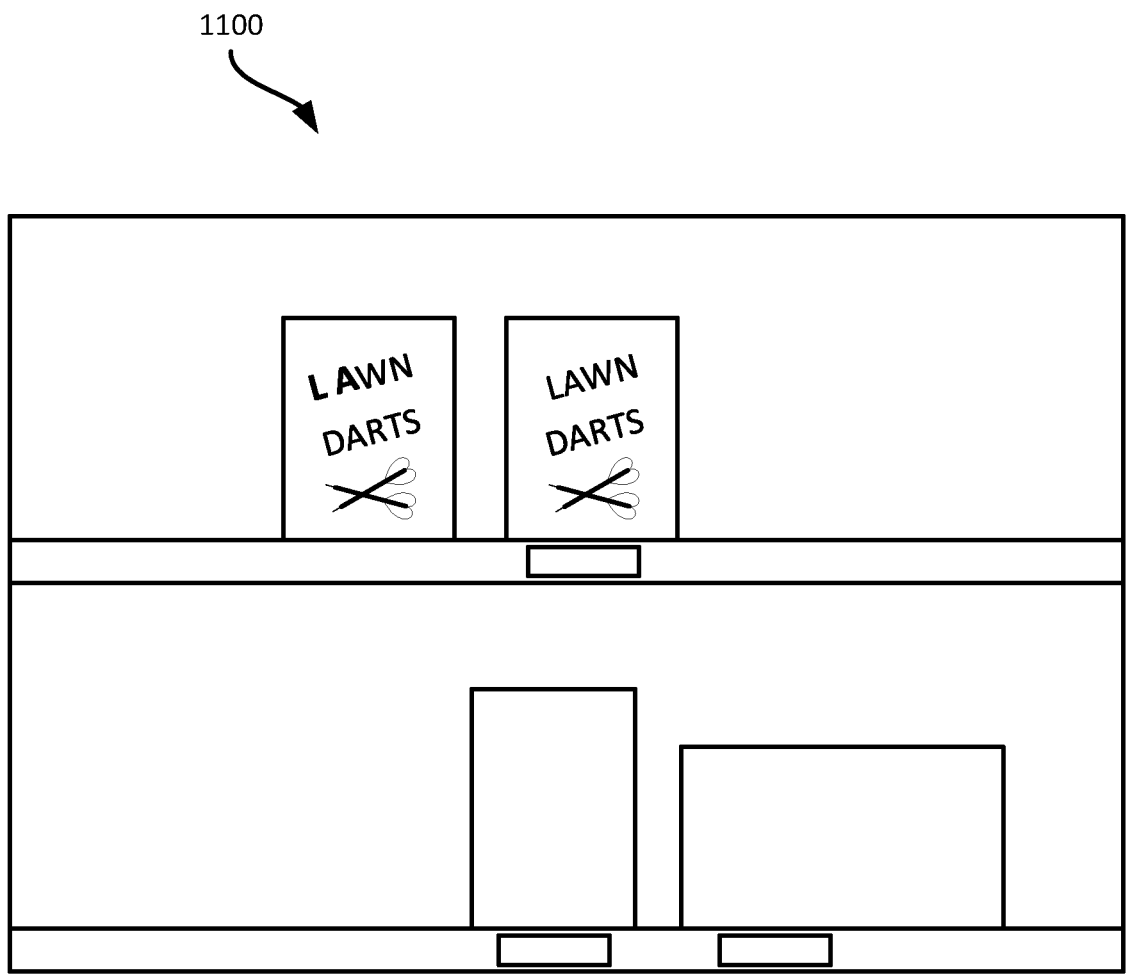
FIG. 11 is a diagram illustrating an orthographic projection generated at block 535 of the method of FIG. 5.

For example, FIG. 11 shows an orthographic projection 1100 of the mapped mesh structure of the module 410. Notably, since the panoramic image of the support structure is generated using an orthographic projection, perspective effects are lost. That is, the two visible products 412-3 which are at different depths on the shelf 417-1 may appear to be the same size. Further, since the panoramic image does not stitch together images which depict different apparent distances between objects viewed from different angles, the panoramic image does not encounter ghosting artifacts due to parallax. That is, the distances between objects are in the panoramic image generated by the presently described method are objectively determined based on the point cloud and the orthographic projection, rather than being dependent on the angle of the image capture, which provides a parallax-tolerant panoramic image of the support structure.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method, comprising:
   obtaining a point cloud captured by a depth sensor, the point cloud representing a support structure bearing a set of objects;
   obtaining a set of images of the support structure and the set of objects, the set of images captured by an image sensor from a plurality of positions alongside a length of the support structure;
   generating a mesh structure using the point cloud, the mesh structure including a plurality of cells and representing a surface of the support structure and the set of objects;
   for each cell in the mesh structure, selecting an image from the set of images and projecting the selected image to the cell; and
   generating an orthographic projection of the mesh structure onto a shelf plane of the support structure,
   wherein selecting the image comprises:
      obtaining 3D coordinates of the cell,
      identifying a subset of the images which correspond to the 3D coordinates of the cell, and
      selecting the image from the subset of the images.

2. The method of claim 1, wherein selecting the image from the subset comprises selecting the image having a largest projection area for a region corresponding to the selected cell.

3. The method of claim 1, wherein selecting the image from the subset comprises:
   obtaining a first image from the subset;
   determining whether the first image includes image artifacts within a region corresponding to the cell;
   when the first image includes image artifacts within the region corresponding to the cell, selecting a second image from the subset;
   when the first image does not include image artifacts within the region corresponding to the cell, selecting the first image.

4. The method of claim 1, further comprising:
   identifying a group of cells corresponding to at least a portion of a surface represented by the selected cell;
   wherein selecting the image comprises selecting the image for the group of cells.

5. The method of claim 4, wherein selecting the image comprises:
   determining 3D coordinates of each of the cells in the group of cells; and
   selecting the image corresponding to a highest proportion of the cells based on the 3D coordinates of the cells.

6. The method of claim 1, wherein projecting the image onto the cell comprises updating the mesh structure to store a portion of the image corresponding to the cell in association with the cell.

7. The method of claim 1, wherein the mesh structure is optimized for the orthographic projection.

8. The method of claim 1, wherein the shelf plane represents a shelf back of the support structure.

9. The method of claim 1, wherein the shelf plane includes shelf edges of a set of shelves of the support structure.

10. A computing device comprising:
   a memory;
   a processor interconnected with the memory, the processor configured to:
      obtain a point cloud representing a support structure bearing a set of objects;
      obtain a set of images of the support structure and the set of objects, the set of images captured from a plurality of positions alongside a length of the support structure;
      generate a mesh structure using the point cloud, the mesh structure including a plurality of cells and representing a surface of the support structure and the set of objects;
      for each cell in the mesh structure, select an image from the set of images and project the selected image to the cell; and
      generate an orthographic projection of the mesh structure onto a shelf plane of the support structure,
      wherein, to select the image, the processor is configured to:
         obtain 3D coordinates of the cell,
         identify a subset of the images which correspond to the 3D coordinates of the cell, and
         select the image from the subset of the images.

11. The computing device of claim 10, wherein, to select the image from the subset, the processor is configured to select the image having a largest resolution for a region corresponding to the selected cell.

12. The computing device of claim 10, wherein, to select the image from the subset, the processor is configured to:
   obtain a first image from the subset;
   determine whether the first image includes image artifacts within a region corresponding to the cell;
   when the first image includes image artifacts within the region corresponding to the cell, select a second image from the subset;
   when the first image does not include image artifacts within the region corresponding to the cell, select the first image.

13. The computing device of claim 10, wherein the processor is further configured to:
   identify a group of cells corresponding to at least a portion of a surface represented by the selected cell;
   wherein select the image comprises selecting the image for the group of cells.

14. The computing device of claim 13, wherein to select the image, the processor is configured to:
   determine 3D coordinates of each of the cells in the group of cells; and
   select the image corresponding to a highest proportion of the cells based on the 3D coordinates of the cells.

15. The computing device of claim 10, wherein to project the image onto the cell, the processor is configured to update the mesh structure to store a portion of the image corresponding to the cell in association with the cell.

16. The computing device of claim 10, wherein the mesh structure is optimized for the orthographic projection.

17. The computing device of claim 10, wherein the computing device is a server.

18. The computing device of claim 10, wherein the computing device is a mobile apparatus.

19. The computing device of claim 18, wherein the mobile apparatus further comprises:
   a depth sensor configured to capture the point cloud; and
   an image sensor configured to capture the set of images.

* * * * *